United States Patent
Nesbitt

(10) Patent No.: US 6,991,683 B2
(45) Date of Patent: *Jan. 31, 2006

(54) APPARATUS FOR SIMULTANEOUSLY COATING AND MEASURING PARTS

(75) Inventor: Bruce Nesbitt, Chicago, IL (US)

(73) Assignee: Dimension Bond Corporation, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/828,694

(22) Filed: Apr. 21, 2004

(65) Prior Publication Data

US 2004/0194699 A1 Oct. 7, 2004

Related U.S. Application Data

(63) Continuation of application No. 10/190,980, filed on Jul. 8, 2002, now Pat. No. 6,860,947.

(51) Int. Cl.
B05C 11/00 (2006.01)
B05C 5/00 (2006.01)

(52) U.S. Cl. .................. 118/712; 118/313; 118/300; 250/559.19

(58) Field of Classification Search ............... 118/313, 118/712, 713, 52, 612, 668, 300; 396/604, 396/611; 250/559.24, 559.19
See application file for complete search history.

(56) References Cited

U.S. PATENT DOCUMENTS

| | | | |
|---|---|---|---|
| 3,645,581 A | 2/1972 | Lasch, Jr. et al. | |
| 5,001,353 A | 3/1991 | Odake et al. | |
| 5,229,840 A | 7/1993 | Arnarson et al. | |
| 5,277,928 A | 1/1994 | Strandberg | |
| 5,366,757 A | 11/1994 | Lin | |
| 5,374,312 A | 12/1994 | Hasebe et al. | |
| 5,375,613 A * | 12/1994 | Aindow et al. | ............. 131/281 |
| 5,429,682 A | 7/1995 | Harlow et al. | |
| 5,666,325 A | 9/1997 | Belser et al. | |
| 5,709,905 A | 1/1998 | Shaw et al. | |
| 5,757,498 A | 5/1998 | Klein, II et al. | |
| 5,759,615 A | 6/1998 | Lasley et al. | |
| 5,871,805 A | 2/1999 | Lemelson | |
| 5,902,399 A * | 5/1999 | Courtenay | ................... 118/52 |
| 5,959,731 A | 9/1999 | Jones | |
| 6,169,605 B1 | 1/2001 | Penn et al. | |

(Continued)

OTHER PUBLICATIONS

Keyence, *High-speed Laser Scan Micrometer*, Cat. No. LS5-C (1999).

*Primary Examiner*—Chris Fiorilla
*Assistant Examiner*—Yewebdar Tadesse
(74) *Attorney, Agent, or Firm*—Bell, Boyd & Lloyd LLC

(57) ABSTRACT

An apparatus and method for simultaneously coating and measuring a part. The apparatus includes a part support, a sprayer and a part measurer positioned adjacent to the part support and a display device positioned adjacent to the part support. The sprayer applies a coating to a section of the part while the part measurer continuously measures a dimension of the section of the part being coated. In one embodiment, an initial amount of coating and a final amount of coating are applied to the section of the part based on the dimension measurements and desired dimension of the part. In another embodiment, the amount of coating applied to the part is based on the desired coating thickness. As a result, the apparatus and method of the present invention significantly reduces the margin of error related to the application of coatings to parts.

31 Claims, 16 Drawing Sheets

U.S. PATENT DOCUMENTS

| | | |
|---|---|---|
| 6,270,579 B1 | 8/2001 | Subramanian et al. |
| 6,376,013 B1 * | 4/2002 | Rangarajan et al. ........ 427/240 |
| 6,388,754 B1 | 5/2002 | Nishikawa et al. |
| 6,421,929 B1 | 7/2002 | Keefe |
| 6,423,371 B1 | 7/2002 | Nesbitt |
| 6,459,951 B1 | 10/2002 | Griffith et al. |
| 6,548,115 B1 | 4/2003 | Gibson et al. |
| 6,549,291 B1 | 4/2003 | Dieter et al. |
| 6,667,070 B1 | 12/2003 | Adem |
| 2004/0003776 A1 | 1/2004 | Nesbitt |
| 2004/0005402 A1 | 1/2004 | Nesbitt |

* cited by examiner

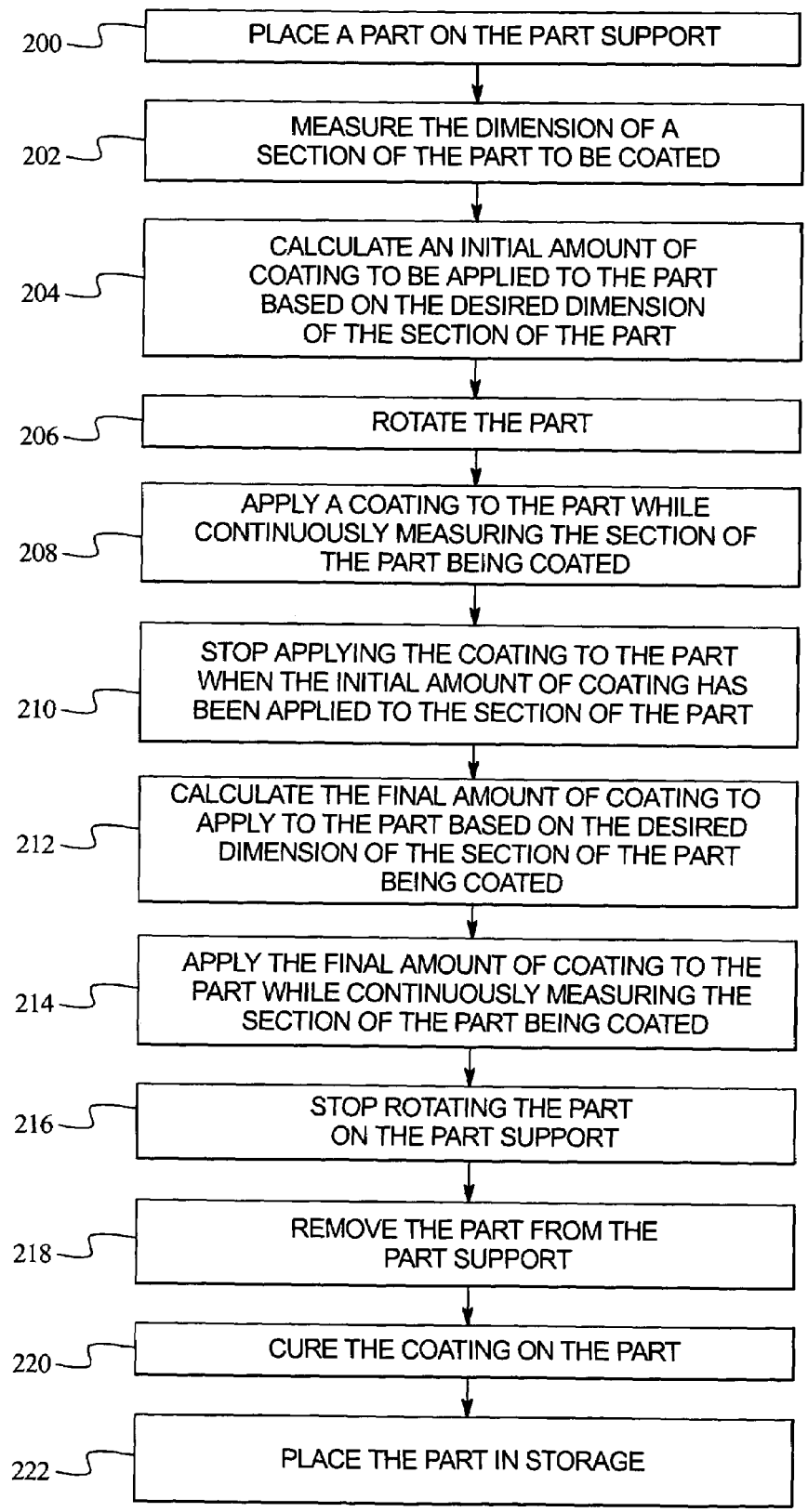

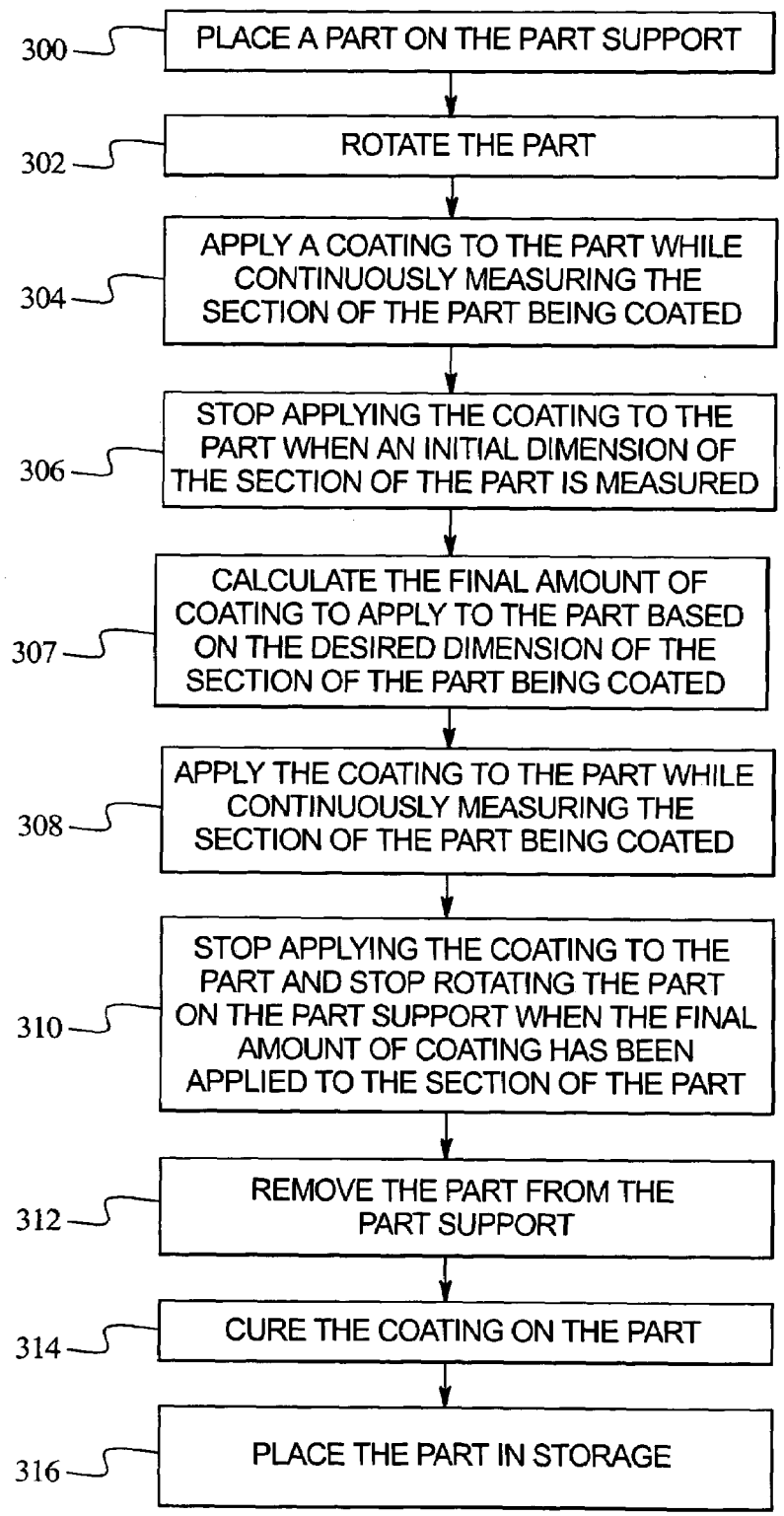

APPARATUS FOR SIMULTANEOUSLY COATING AND MEASURING PARTS

PRIORITY CLAIM

This application is a continuation of, claims priority to and the benefit of U.S. patent application Ser. No. 10/190,980, filed Jul. 8, 2002, now U.S. Pat. No. 6,860,947 which is incorporated herein in its entirety.

CROSS REFERENCES TO RELATED APPLICATIONS

This application relates to the following commonly owned patent applications: "Apparatus and Method for Forming a Bonding on a Tapered Part." Ser. No. 09/782,695, now U.S. Pat. No. 6,423,371 B1, "Method for Simultaneously Coating and Measuring Parts," Ser. No. 10/190,982, Apparatus for Simultaneously Coating and Measuring Parts," Ser. No. 10/190,980, now U.S. Pat. No. 6,860,947 B1; "Apparatus for Simultaneously Coating and Measuring Parts," Ser. No. 10/447,249, now U.S. Pat. No. 6,832,577 B2; "Apparatus for Simultaneously Coating and Measuring Parts," Ser. No. 10/810,179; "Apparatus and Method for Simultaneously Coating and Measuring Parts," Ser. No. 11/014,557, and "Apparatus and Method for Simultaneously Coating and Measuring Parts," Ser. No. 11/014,558.

BACKGROUND OF THE INVENTION

The present invention relates in general to a coating apparatus and specifically, to an apparatus and method for simultaneously coating and measuring a part, and simultaneously coating the part based on the desired dimension of the part, desired coating thickness or both the desired dimension and coating thickness.

Several different types of parts are manufactured and assembled for various industries. The parts are used on different types of products, devices, equipment and machines. The characteristics of the parts vary based on the particular use for the parts. Some parts used in certain products, devices, equipment and machines are often subject to stress such as wear and heat. Eventually, certain parts break or become ineffective after continuous and repeated use.

One method commonly used to increase the durability of the parts subject to various types of stresses during operation is to apply protective coatings to the parts. Some coatings protect parts against friction or wear so that the parts are more durable and last longer in operation. Other coatings enhance the aesthetic appearance of the parts. Coatings may be applied to the entire part or only applied to a particular wall, portion or section of the part. The particular coating, and application of the coating, depends in part on the part and the coating process requested or desired by the manufacturer of the part, purchaser of the part or user of the part.

Known coating apparatus coat several different types of parts including fabricated, molded and die-cast parts. Such parts are typically manually placed on a part holder or support and then sprayed with a coating. The part may be moved as necessary to coat the part or the particular portions of the part. The vast majority of parts have dimensional tolerances or tolerance levels, and design specifications that limit the size (including all dimensions) of the part and the amount of coating, such as the maximum and minimum amount of the coating that may be applied to the part or any section, portion or dimension of the part. The maximum and minimum coating thicknesses for a part or parts are determined based on corrosion requirements and other similar quality or design parameters. The dimensional tolerances and design specifications are determined from detailed calculations based on the particular machine, equipment, product, device or industrial operation that the part will be used in. Therefore, the part must be measured to ensure that the part falls within and does not exceed the particular dimension tolerances and/or maximum and minimum coating thicknesses specified for the part.

In one known process, non-coated parts are initially measured to determine if they are within an acceptable dimensional range. Some non-coated parts are too large and cannot be coated because the coating will make the parts larger than the upper dimensional limit of the parts, and unfit for use. Other non-coated parts are too small and cannot be coated because too much coating would have to be applied to the parts in order to meet the predetermined dimensional tolerances. Such excessive coating on a part may become weak and may be prone to breaking or causing the part to fail during operation. Such unusable parts are usually discarded or recycled. The parts that are within an acceptable dimensional range for coating are individually placed on a part support and sprayed or coated by a sprayer. The sprayer sprays or coats the part with an amount of coating determined according to a particular formula that is calculated, and often estimated, by the operator or processor so that a reasonably sufficient amount of coating is applied to the part to make the part within dimensional tolerances. In certain known coating systems, the amount of coating is not determined for each part, but rather for a group or lot of parts. Therefore, the amount of coating applied to each part may or may not be based on the exact measurement of such part.

In other known coating systems, prior to coating the part, the part is measured to determine if it is within acceptable dimensional ranges established for the part. If the part is within the acceptable dimension range, the amount of coating needed to coat the part to achieve the final product size is calculated and then applied to the part. After the coating is applied, the part is measured to ensure that the part with the coating is still within the dimensional tolerance limits and design specifications for the part. If the final part is not within the dimensional tolerance limits and design specifications for the part, the part is discarded. If the part falls within the tolerance limits and design specifications for the part, the part is removed from the part support and transported to the manufacturer, purchaser or user of the part.

One known problem with such known coating processes is that the coating that is applied to the part is applied without any measurements taken while the part is being coated. After completion of the coating process, the part is measured to determine if it is within established dimensional tolerance levels and design specifications. If the coated part is not within the established tolerance levels and design specifications, the part cannot be used for its intended purpose. If the part is too large or too big, the part dimension cannot be reduced in order to meet the desired design specifications. Similarly, if the part is too small after applying the coating, additional coating cannot be applied because the original coating has dried and additional layers of coating would diminish the strength and durability of the part due to poor adhesion between the coating layers. Therefore, a significant margin of error is introduced into or present in the known coating processes based on the calculation of the amount of coating to be applied to achieve the final product. The known coating processes calculate the total amount of coating needed to achieve the final part size only at the beginning of the coating process and in certain systems based on measurements taken of a group or lot of parts instead of individually on the part to be coated. In such case, all of the calculated amount of coating is applied to the part. Applying a large amount of coating to the part is less accurate than applying a smaller amount of coating because the margin of error is greater.

Accordingly, there is a need for a coating apparatus and method that accurately measures a part size and/or the maximum and minimum coating thicknesses of a part while coating the part so that the part is coated with greater accuracy, consistency and efficiency, which reduces the overall number of unusable coated parts.

SUMMARY OF THE INVENTION

The present invention provides a coating apparatus and method and more specifically a coating apparatus and method which measures a part, applies a coating to the part based on such measurement and continuously measures the part during the coating process.

One embodiment of the coating apparatus and method of the present invention includes a frame, a part support positioned adjacent to the frame, a sprayer connected to the frame and positioned adjacent to the part support, a part measurer connected to the frame and positioned adjacent to the part support, a processor that receives the measurements recorded by the part measurer and calculates the particular dimension of the part before and as the part is being coated by the sprayer and a display device that displays the part dimension or size to an operator before, after and during the coating process. In one embodiment, the coating method of the present invention applies an initial amount of coating and then a final amount of coating to the part. Applying the coating in two steps and in one embodiment applying a smaller final amount of coating, reduces the margin of error associated with the coating process which increases the accuracy of the coating process.

In one embodiment, the part support receives and holds the part during the measuring and coating process and rotates or otherwise moves the part as needed to ensure that the part or the portion or section of the part to be coated is sufficiently and equally coated by the sprayer. The part support is mounted on a housing which encloses a motor. The motor is mounted in the housing and causes the part support to rotate or otherwise move. The motor housing is secured to the frame to maintain the position of the part during the coating process. In another embodiment, the part support includes a conveyor which is positioned adjacent to the frame and adapted to hold and transport a plurality of parts. The conveyor transports each part to be coated by the sprayer. The conveyor then transports the parts to other processes which makes the coating process fully automated.

In one presently preferred embodiment, the part measurer is secured to the frame and includes a laser generator and a laser receiver. In one embodiment, the laser generator is a laser scan micrometer. However, the laser generator may be any suitable laser generator. The laser generator generates a continuous laser beam which includes a plurality of rays which are projected onto the part and specifically on the dimension of the part to be coated. In one preferred embodiment, the laser generator and laser receiver are each mounted in protective housings. Each housing preferably includes a transparent removable section or member which enables the laser beam to pass through the section while protecting the laser generator and laser receiver from overspray. Certain portions of the laser beam or certain rays of the laser beam pass by the part and are received by the laser receiver. Other portions of the beam or certain rays are blocked by the part and are not received by the laser receiver. The laser receiver generates electrical signals based on the received portions of the laser beam. The signals are communicated to the processor which calculates the measurement of the dimension the part based on which rays are blocked and which rays are received by the laser receiver. The measurement data is communicated to the display device and displayed to an operator. In one embodiment, the operator may choose the type of information that is displayed on the display screen of the display device, such as the upper and lower dimension tolerance levels for the part.

In one presently preferred embodiment, an exhaust duct is positioned on the side of the part support opposite the sprayer. The exhaust duct generates a vacuum or suctioning affect, which suctions and captures excessive spray or overspray generated by the sprayer which is not applied to the part. The exhaust duct may be any suitable type of exhaust duct.

In one presently preferred embodiment, the coating apparatus includes air movers positioned adjacent to the housings for the laser generator and the laser receiver to direct air across the transparent sections of the housing. This minimizes the amount of overspray from the sprayer that accumulates on the surfaces of the transparent sections of the housings of the laser generator and the laser receiver. Such accumulated coatings would eventually obstruct the laser beam generated by the laser generator and affect the measurement of the parts. In one preferred embodiment, the protective transparent members, plates or panels such as glass plates are slideably connected to the housings of the laser generator and the laser receiver. It should be appreciated that the air movers may alternatively suction air to remove the excess coating from the vicinity of the glass plates.

One embodiment of the method of the present invention generally includes the steps described below. The part is initially measured to determine if the part is within a particular range of acceptable dimensions or sizes for the parts. To take the measurement, the laser generator generates a laser beam which is directed at the part. The laser receiver receives the unblocked portions of the laser beam and converts this information into electrical signals. The electrical signals are communicated to the processor, which calculates the dimension or size measurement of the part and/or the coating thickness of the coating on the part. If the part is unacceptable (i.e., the part size or coating thickness is not within an acceptable range) a prompt is provided to the user and the part is removed and discarded or recycled as necessary. If the part size and/or coating thickness is within an acceptable range, the measurement is communicated to the display device, which displays the measurement information to the operator. In a fully automated embodiment, the measurement is communicated to a robot (i.e., processor) or other processor, which controls the operation of the apparatus. In the semi-automated embodiment described above, the operator presses or activates an input such as a start button or pedal to initiate the coating process. After the input is activated, the processor turns the sprayer on and begins to coat the part. Once the part achieves the desired size, dimension and/or coating thickness for the part, the sprayer is shut off and the coated part is transported to another manufacturing area for further processing.

The coating may be applied in one or more steps using one or more spray guns to apply the coating or coatings to the part. In one presently preferred embodiment of the present invention, the coating is applied to the part in two steps. First, an initial amount of coating is calculated and applied to the part. The initial amount of coating is preferably greater than half of the total amount of coating applied to the part. In one embodiment, a significant percentage of the total coating such as approximately ninety-five percent of the total coating is first applied to the part. The part is then measured and a final amount of coating is calculated and applied to the part. The final amount of coating is a smaller amount and therefore, the margin of error in calculating the amount of coating to be applied is significantly smaller. By coating the part in two sequential coating steps, the present invention significantly reduces the margin of error or deviation between the final part size and the desired part size.

In another embodiment, the coating is applied to the part based on the desired dimension for the part. In this embodiment, the sprayer applies a coating to the part while the part measurer measures the dimension of the part being coated. The sprayer continues to apply the coating to the part until a predetermined dimension is achieved for the part. At this point, a final amount of coating is calculated and applied to the part as described above. The sprayer applies the final amount of coating to the part while the part measurer measures the part until the desired dimension is achieved.

In a further embodiment, the sprayer applies the coating to the part while the part measurer measures the part until the final desired dimension is achieved for the part. Therefore, the coating is applied to the part until the part measurer measures the desired dimension for the part.

In another embodiment, the coating is applied based on the desired thickness of a coating applied to the part. The coating is applied to the part while the part measurer measures the thickness of the coating on the part. When a desired coating thickness is achieved, the sprayer shuts off and the part is transported for further processing.

In a further embodiment, one or more coatings are applied to a part using a plurality of sprayers or spray guns. In one aspect of this embodiment, three sprayers are directed at a section of a part to be coated and the sprayers apply a base coating or primer, a middle coating or midcoat and a final coating or topcoat to the section of the part. The coatings are applied to the part separately while the part measurer simultaneously measures the thickness of each of the coatings as the coatings are applied to the part. The processor receives the coating thickness measurements for each of the coatings from the part measurer and controls the sprayers to apply a predetermined amount of each of the coatings to the part.

In one embodiment, the coating apparatus measures and coats only one portion of a part such as the outer surface of the part. In another embodiment, the part support moves the part in different directions such as upwards and downwards, so that more than one portion of a part can be measured and coated. In this embodiment, a shield may be employed to protect the other sections of the part from being coated.

In one embodiment of the present invention, the part is manually placed and removed from the part support in the coating apparatus and method of the present invention. In another embodiment, the part is placed on a part support which includes a conveyer which transports the part. In a further embodiment, the part is mechanically placed and removed from the part support such as by a robotic arm or similar device in the coating apparatus of the present invention. The present apparatus and method significantly enhances the productivity and production rates for manufacturing lines that coat parts because less time is needed to manually move and measure the parts.

It is therefore an advantage of the present invention to provide an apparatus and method for coating a part that simultaneously coats and measures the part.

It is another advantage of the present invention to provide an apparatus and method that significantly enhances coating accuracy.

It is a further advantage of the present invention to provide an apparatus and method that provides consistent coating of parts.

It is another advantage of the present invention to provide a system and method that increases the coating efficiency related to coating parts.

Additional features and advantages of the present invention are described in and will be apparent from, the following Detailed Description of the Invention and the figures.

BRIEF DESCRIPTION OF THE FIGURES

FIG. 3A is a flowchart illustrating one embodiment of the coating method of the present invention.

FIG. 3B is a flowchart illustrating another embodiment of the coating method of the present invention.

DETAILED DESCRIPTION OF THE INVENTION

Figure 1A:
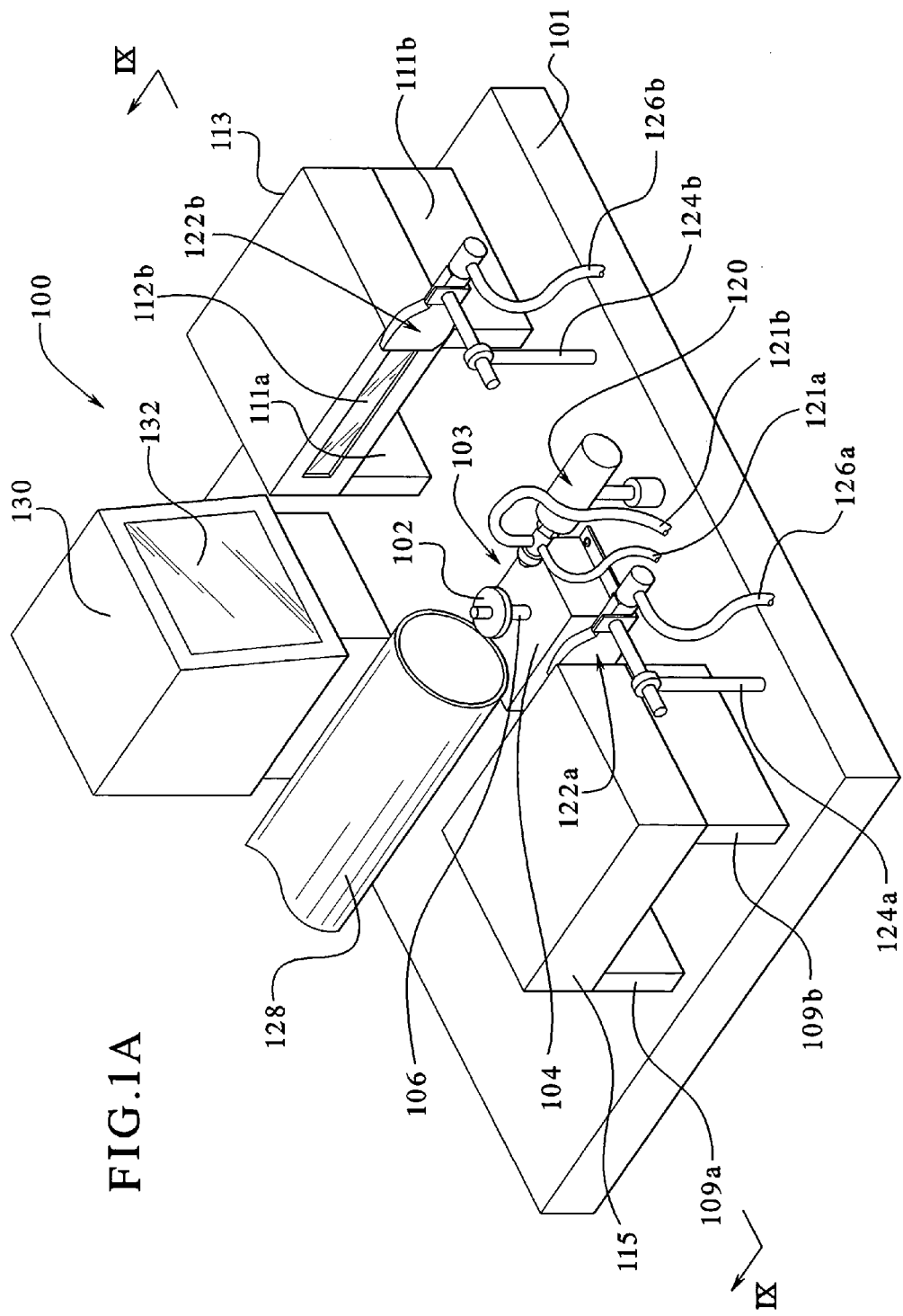
FIG. 1A is a perspective view of one embodiment of the present invention.
Figure 1B:
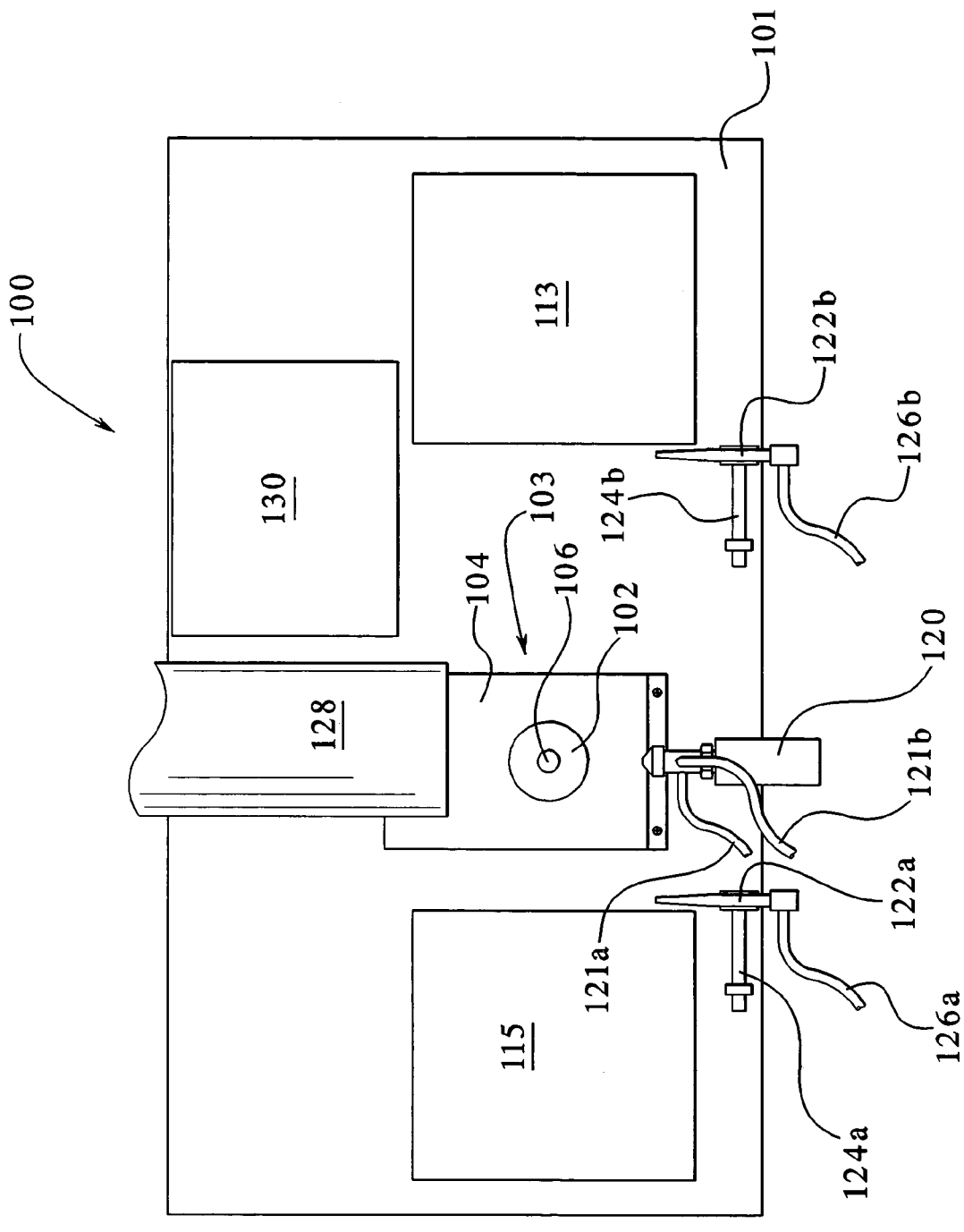
FIG. 1B is a top plan view of the embodiment of FIG. 1A.
Figure 9:
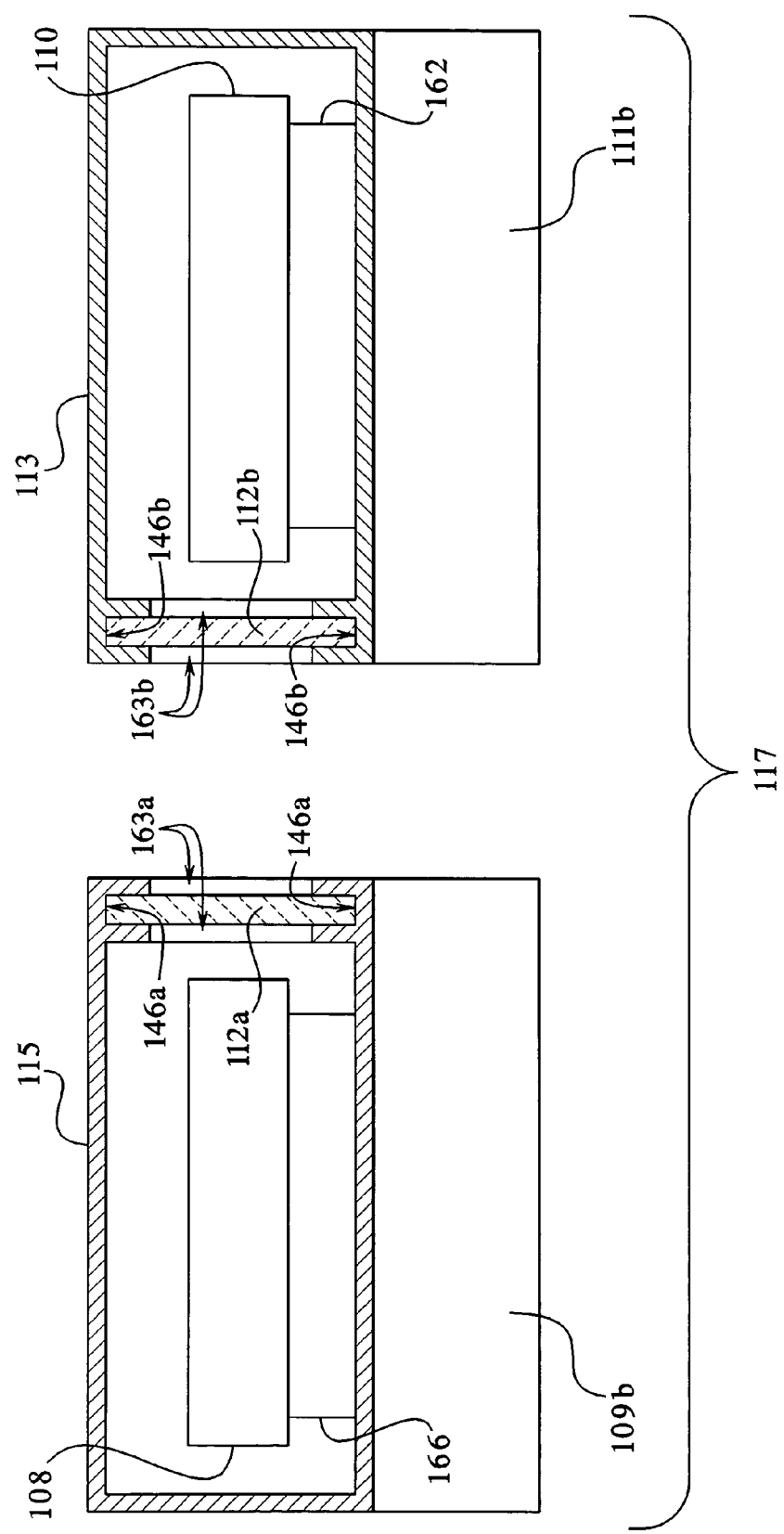
FIG. 9 is a cross-sectional view taken substantially along line IX—IX of FIG. 1 illustrating the laser generator and the laser receiver.
Figure 10:
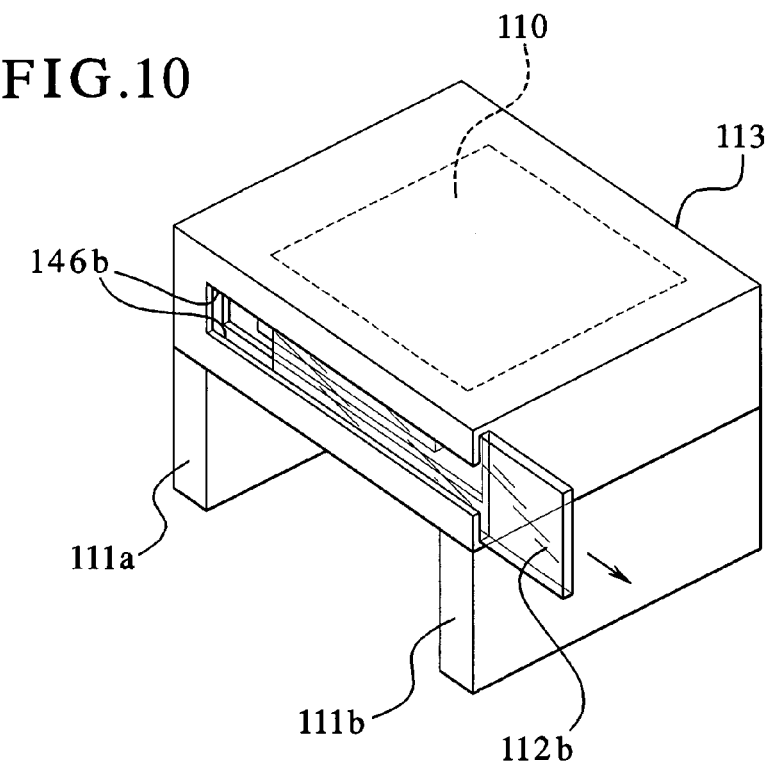
FIG. 10 is a perspective view of the laser generator of FIG. 1 showing a removable glass panel slideably connected to the front of the housing of the laser generator.

Referring now to FIGS. 1, 2 and 9, one embodiment of the coating apparatus 100 of the present invention is illustrated. The apparatus 100 includes a frame, housing, or support 101, a part support 103 connected to the frame for holding a part 102, a sprayer 120 connected to the frame for applying a coating to the part, and a part measurer 117 for measuring a dimension of the part. The frame 101 preferably includes a suitable surface that can support the apparatus of the present invention. In one embodiment, the frame 101 is stationary and secured to a bench or tabletop (not shown). In another embodiment, the frame 101 is transportable so that the frame can be used at remote locations.

The part support 103 includes a housing 104, which is connected to the frame 101 using suitable fasteners or in other conventional manners (not shown). The housing 104 encloses a suitable motor (not shown), which in one embodiment provides power to the spindle 106 to rotate or otherwise move the spindle. The spindle 106 is formed to hold or support the part 102. In one embodiment, the spindle includes a mounting surface shown in FIG. 9. The part 102 is placed onto and secured to the surface so that the part does not move or disengage the spindle 106. In operation, the spindle 106 may move in any suitable direction as needed for coating the part. In one embodiment, spindle 106 rotates in a counterclockwise direction, which in turn rotates the part 102 in a counterclockwise direction. It should be appreciated that the spindle 106 may rotate in a clockwise direction, counter-clockwise direction or any sequence or combination of directions. The spindle 106 may also move up and down or in other directions for coating different sections of the part having different dimensions. In one embodiment, the part support moves or rotates the part and only one portion or dimension of the part 102 is coated by the sprayer. In another embodiment, the part support moves upwards, downwards or in any desired direction to coat more than one portion of a part. In this embodiment, a shield or panel (not shown) is secured to the housing 104 and positioned adjacent to the part on the part support to prevent the shielded portions of the part from being coated.

Figure 2A:
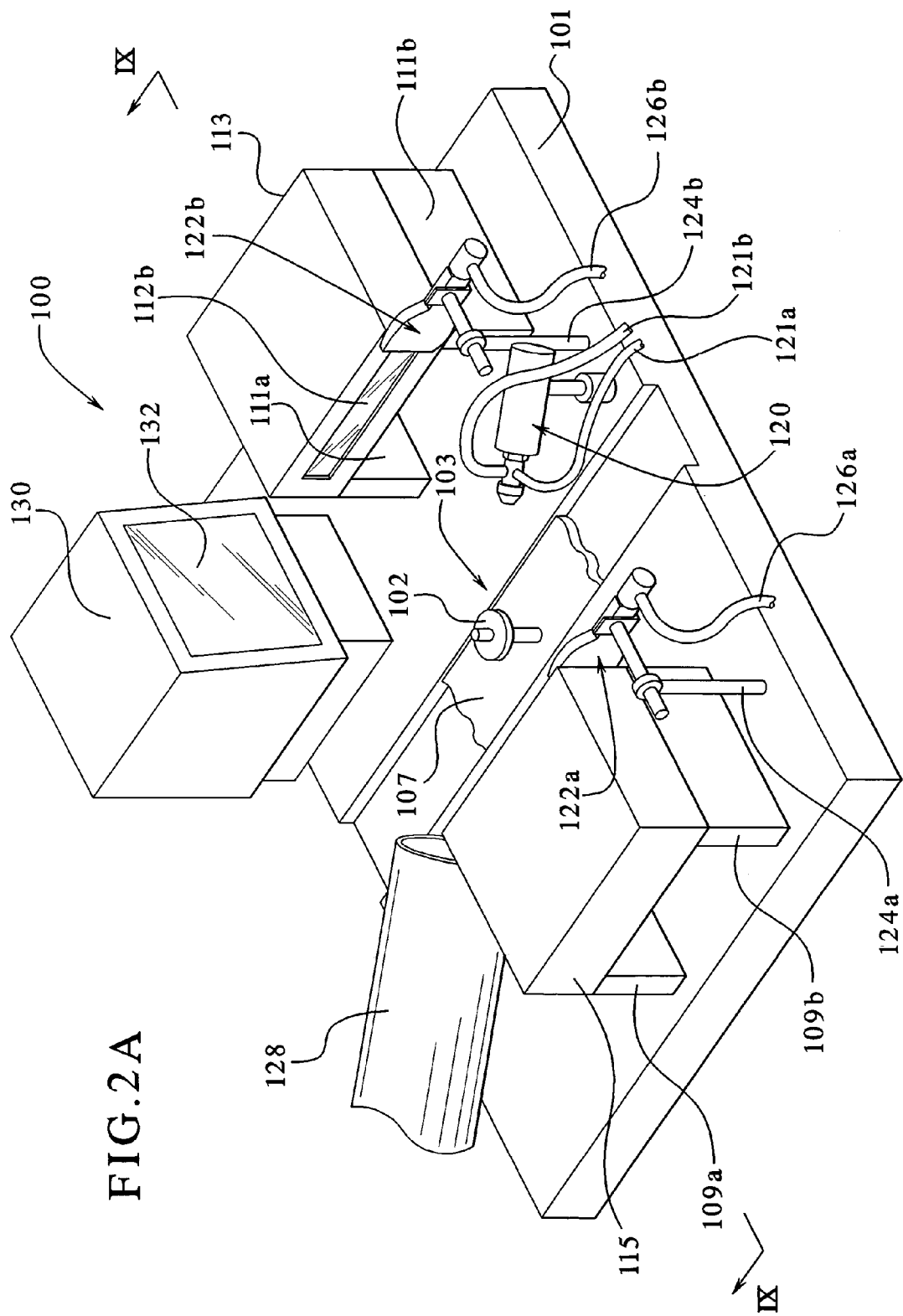
FIG. 2A is a perspective view of another embodiment of the present invention.
Figure 2B:
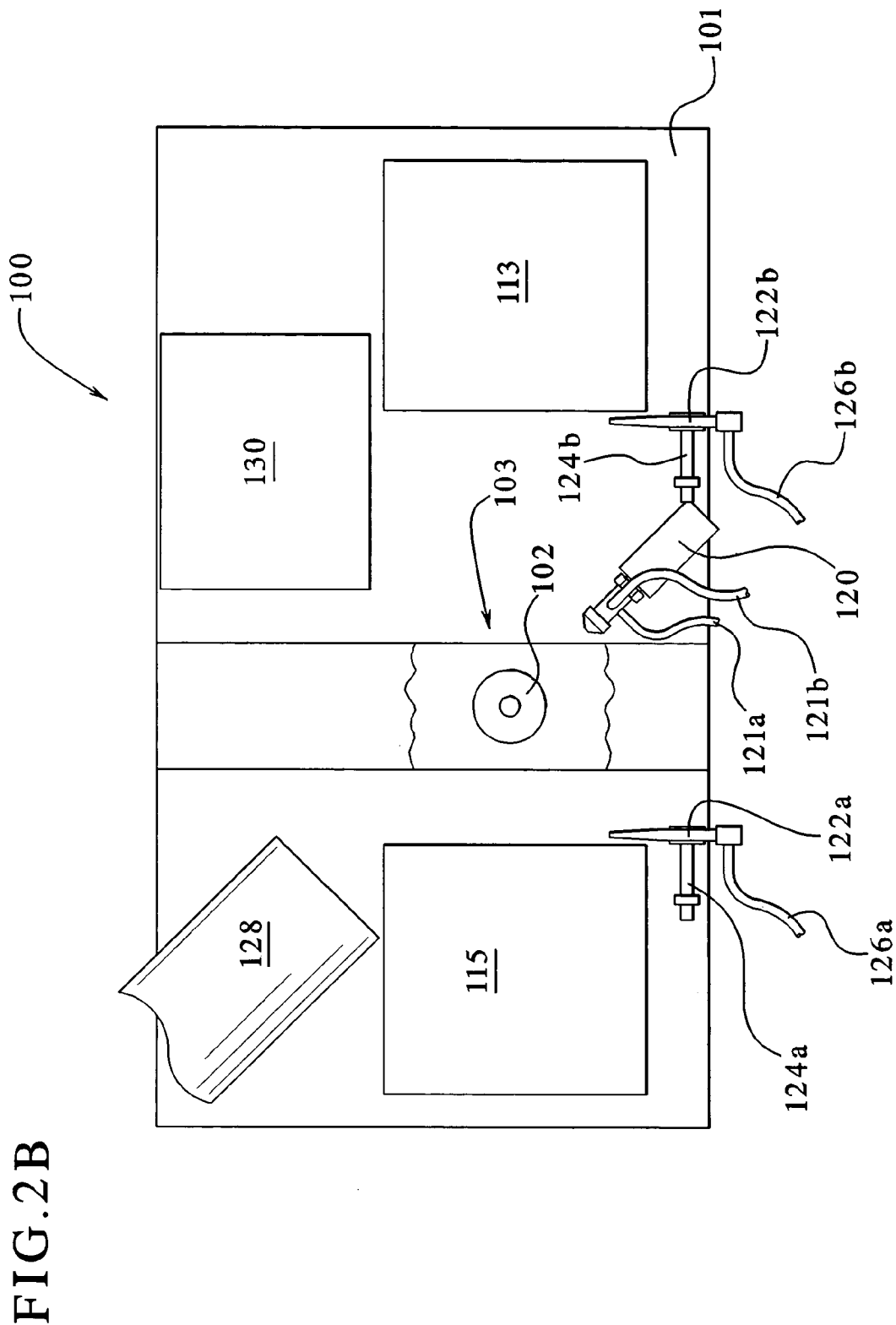
FIG. 2B is a top plan view of the embodiment of FIG. 2A.

In another embodiment of the present invention illustrated in FIGS. 2A and 2B, the part 102 is supported by the spindle 106 which is attached to and transported on a conveyor 107. The part is manually or mechanically placed onto the spindle 106 on the conveyor. The conveyor then transports the part between the laser generator and the laser receiver. The part is coated by the sprayer 120 while the laser generator and laser receiver measure the dimension being coated on the part. The conveyor 107 then transports the coated part to other manufacturing areas such as to an oven or kiln which cures the coating on the part. As a result, all of the components of the apparatus and method of the present invention are fully automated and adapted to sequentially coat a plurality of parts.

Figure 12:
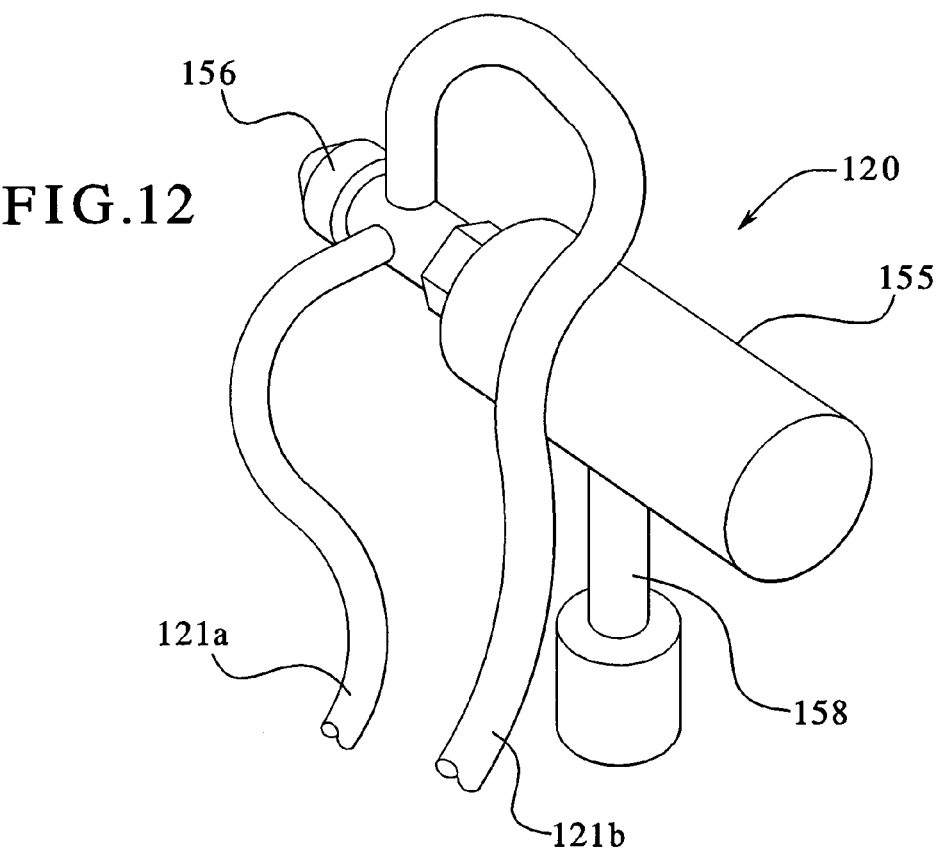
FIG. 12 is an enlarged perspective view of one of the sprayers of the present invention.

In one presently preferred embodiment, a coater such as sprayer 120 is positioned adjacent to the spindle 106. The sprayer may be any suitable sprayer and may emit any suitable type of spray such as liquid spray, powder spray, airless spray, air-assisted spray or any combination therein. The sprayer 120 applies a coating to the part or a portion of the part as the part is moved by the spindle on the part support. It should be appreciated that any suitable sprayer 120, which preferably provides an atomized spray coating, may be used in the present system, such as a pneumatic automatic spray gun manufactured by Paasche Airbrush Company. In the embodiment shown in FIGS. 1 and 12, the sprayer 120 includes a housing 155, which is secured to the frame 101 by support post 158. In one alternative embodiment, the support post is adjustable so that the sprayer is able to coat different portions of a part.

A nozzle 156 extends from the housing 155 to direct the coating emitted from the sprayer 120 towards the part or portion of the part that is being coated. The nozzle 156 is preferably removable from the sprayer housing 155 so that the nozzle can be cleaned or replaced as needed. The nozzle 156 is secured to the housing 155 using suitable fasteners such as conventional co-acting threaded members. It should be appreciated that several different types of nozzles may be used in the sprayer 120 for different types of coating applications.

In another embodiment, two sprayers 120 are employed in the apparatus of the present invention. The sprayer's are connected to the frame and positioned adjacent to the part. In this embodiment, each sprayer may have a different output rate. The output rates may differ based on the amount of coating being applied to the part. The first sprayer coats the part using a high pressure to apply an initial or base amount of coating to the part. The second sprayer coats the part using a lower pressure to apply the final amount of coating. The pressure used to apply the final amount of coating is less than the pressure used to apply the initial amount of coating because the final amount of coating is a smaller amount. The lower pressure enables the operator and/or the processor (i.e., computer) to control the sprayer and therefore, the second sprayer applies the coating with greater accuracy.

Figure 16A:
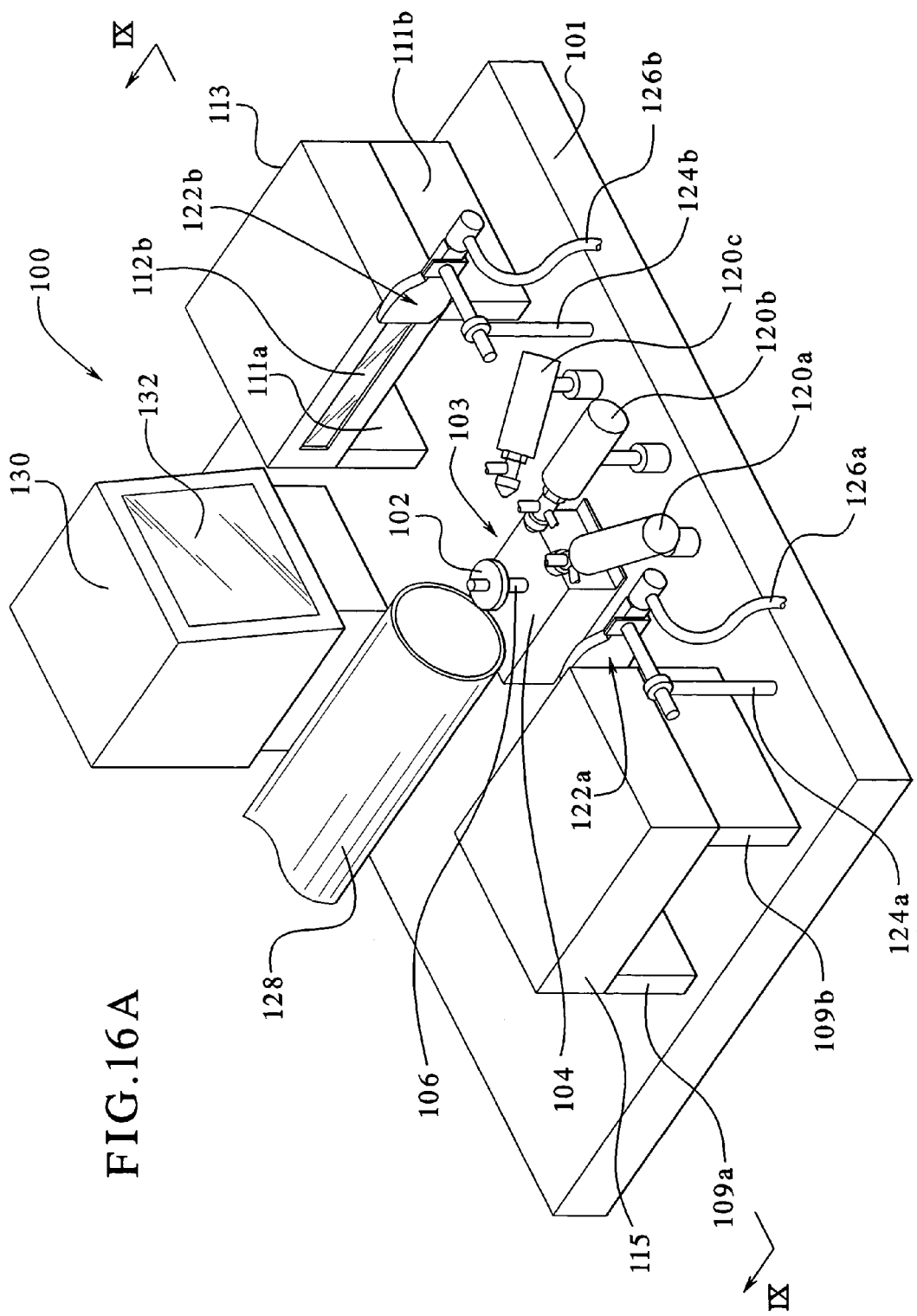
FIG. 16A is a perspective view of a further embodiment of the present invention where the apparatus includes multiple sprayers.
Figure 16B:
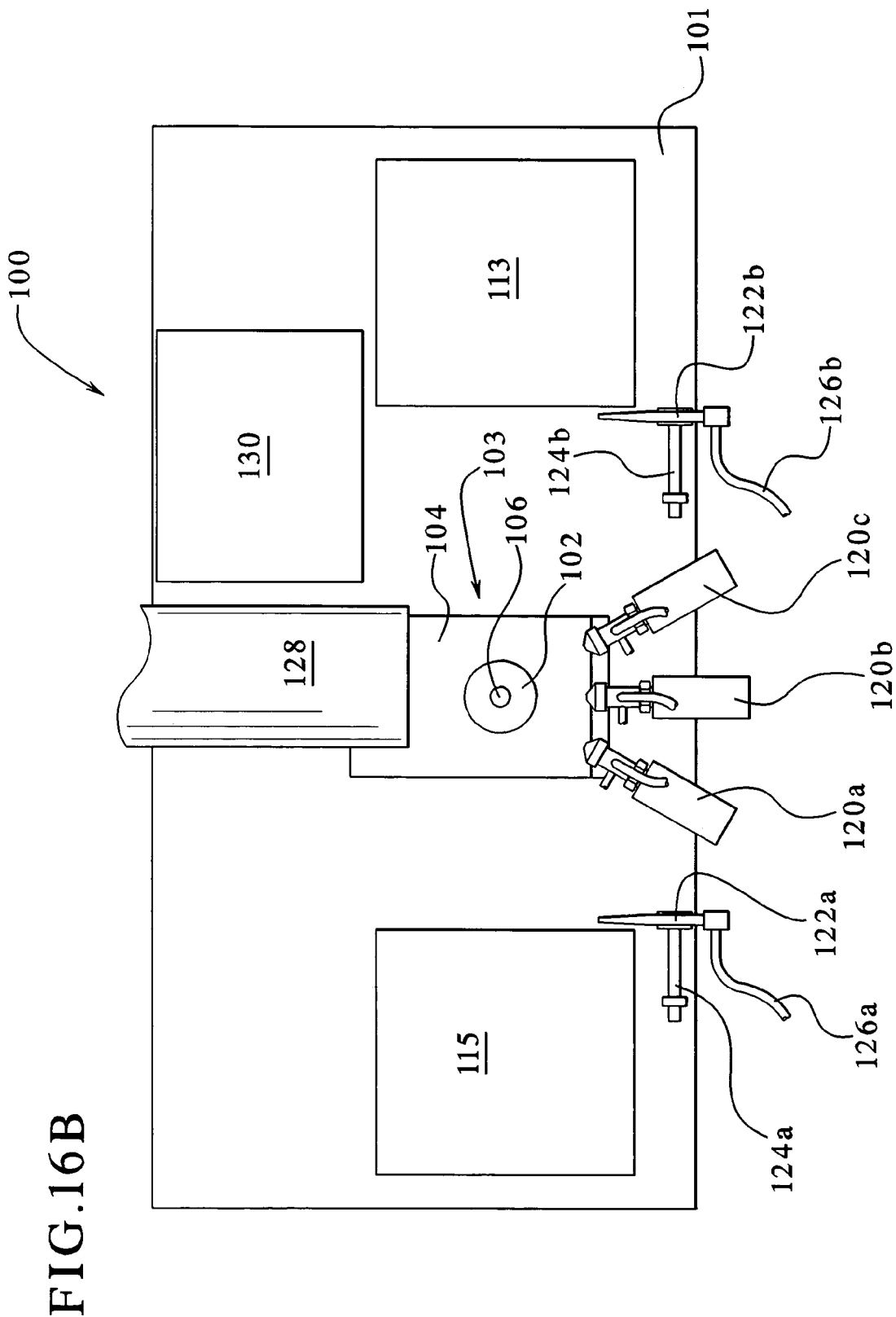
FIG. 16B is a plan view of the embodiment with multiple sprays of FIG. 16A.

In a further embodiment, two or more sprayers 120 are used to apply multiple coatings to a section of a part. As shown in FIGS. 16A and 16B, three sprayers 120a, 120b and 120c are positioned adjacent to the part 102 to apply separate coatings to the part. In this example, sprayer 120a applies a primer or base coating to the section of the part. Next, sprayer 120b applies a mid-coat or middle coating to the primer layer. Finally, sprayer 120c applies a top coat or final coating to the mid-coat layer. Each sprayer may be independently controlled to apply the coatings at the same or different rates. Additionally, the sprayers may be positioned in any suitable position in relation to the part. The part measurer measures the thicknesses of each of the coating layers as the layers are applied to the part and communicates the coating thickness measurements to the processor, which controls the sprayers. Thus, the overall dimension of the section of the part being coated and/or the thicknesses of the coating layers may be controlled by an operator or processor. It should be appreciated that any suitable number of sprayers and coatings may be employed by the present apparatus. It should also be appreciated that the measurement of the coating may be based on the measurement of the part prior to coating, during coating and after coating.

In a further embodiment, a single sprayer 120 having two different output rates is used to coat the part. The output rates are adjusted or changed by adjusting a dial or other suitable control on the sprayer. The control may be adjusted manually or by a processor. It should be appreciated that one or more sprayers may be employed in the present apparatus and several different output rates may be used as desired.

A suitable coating is transported to the sprayer 120 using coating communication line 121a, which is connected to the front portion of the housing 155. The coating communication line 121a transports or communicates coatings from a coating storage tank or container (not shown), which stores the coating. The coating moves through the coating communication line 121*a* into the housing 155. The coating then fills the interior of the housing 155 to enable the sprayer to emit a continuous flow of coating onto a part. Similarly, an air communication line 121*b* transports or communicates pressurized air generated by an air generator such as an air compressor to the housing 155. The pressurized air and coating are simultaneously delivered to the housing 155 and mix inside the housing. The air and coating mixture are emitted from the nozzle 156 as an atomized spray partially due to the pressure created by the compressed air. It should be appreciated that the coating communication line 121*a* and the air communication line 121*b* may be manufactured with any suitable tubing that can withstand the pressures of the coating and air inside the tubing during operation of the coating apparatus.

Referring now to FIGS. 1, 2, 9 and 10, in one preferred embodiment of the present apparatus, the part measurer 117 includes a laser generator 110 and a laser receiver 108. As shown in FIGS. 1 and 2, the laser generator 110 is positioned on one side of the part support 103 and the laser receiver 108 is positioned on the opposing side of the part support 103. The laser generator 110 and the laser receiver 108 are aligned and secured to the frame 101. In one preferred embodiment, the laser generator 110 is mounted in a housing 113 that is connected by support arms 111*a* and 111*b* to the frame 101. Each support arm 111*a* and 111*b* is connected on opposite sides of the housing. The top of the support arms 111*a* and 111*b* are secured to the bottom of the housing 113, and the bottom of the support arms 111*a* and 111*b* are secured to the frame 101. The support arms are made of a suitable material that will support and maintain the stability of the laser generator 110. The support arms 111*a* and 111*b* secure the laser generator 110 in position on the frame 101 so that the laser generator remains stationary during operation.

As illustrated in FIG. 9, in one preferred embodiment, the laser generator 110 includes a laser scan micrometer, such as the LS-5001 laser scan micrometer manufactured by Keyence Corporation, and is mounted inside the housing 113. A support base 162 is connected between the laser scan micrometer and the bottom interior surface of the housing 113 to secure the laser scan micrometer inside the housing. It should be appreciated that the laser scan micrometer may be a free standing device that is positioned and secured inside the housing 113 without a support base 162. The laser scan micrometer is positioned inside the housing 113 so that a laser beam generated by the laser scan micrometer is projected at the proper height and position to contact the part. Opening 163*b* is formed in the housing 113 so that the laser beam generated by the laser scan micrometer is emitted from the housing 113 towards the laser receiver 108 without being obstructed by the housing.

The laser receiver 108 is connected to the frame 101 and manufactured similar to the laser generator 110. The laser receiver 108 is mounted in a housing 115 which is connected to a pair of support arms 109*a* and 109*b*. The support arms 109*a* and 109*b* are connected to opposite sides of the bottom of the housing 115. The bottom portions of the support arms 109*a* and 109*b* are secured to the frame 101 in a suitable manner. The laser receiver 108 is positioned inside the housing 115 and is supported by the support base 166. The support base is connected between the laser receiver and the housing 115. The laser receiver 108 is positioned so that it is vertically and horizontally aligned with the laser generator 110 or laser scan micrometer. Opening 163*a* is formed in the front surfaces of the housing 115 to enable the laser beam generated by the laser scan micrometer to be received by the laser receiver 108.

In one embodiment, channels 146*a* and 146*b* are formed in the top and bottom portions of housings 113 and 115 near the front surfaces of the housings. The channels are formed to enable transparent sections or members such as glass plates 112*a* and 112*b* to be slideably inserted into the channels 146A and 146*b* in the front of housings 113 and 115, respectively. The glass plates 112*a* and 112*b* cover the front surfaces of the housings and protect the laser generator 110 and laser receiver 108 from being coated by excess spray from sprayer 120 that does not adhere to the part or from being damaged during operation. The glass plates 112*a* and 112*b* are removable and can be cleaned as necessary. The plates are also transparent to allow the laser beam to pass through the plates. It should be appreciated that other suitable transparent materials may be used as desired by the manufacturer.

Figure 4:
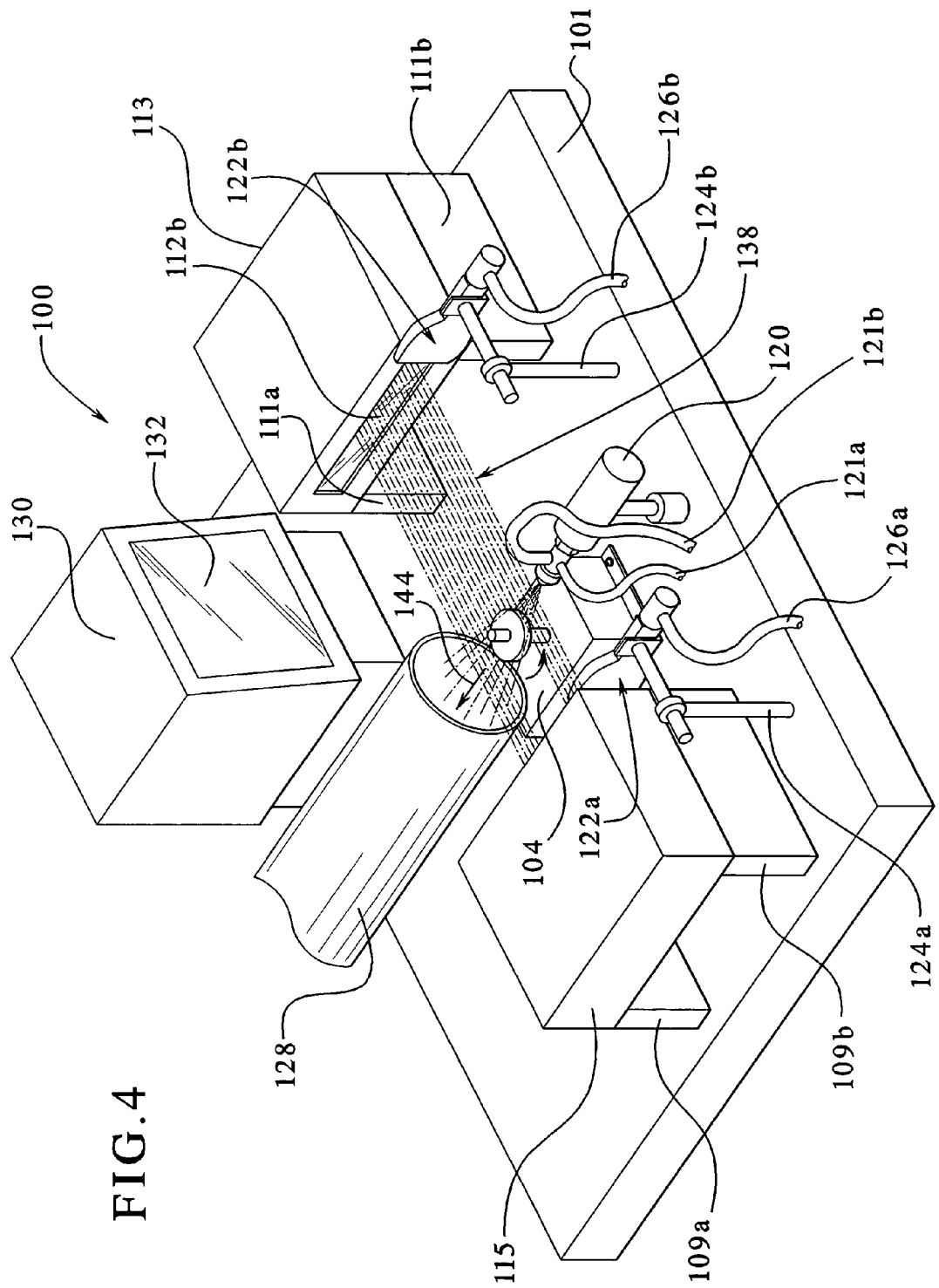
FIG. 4 is a perspective view of the embodiment of FIG. 1 where the outside diameter of a part is measured as the part is coated by the sprayer.
Figure 5:
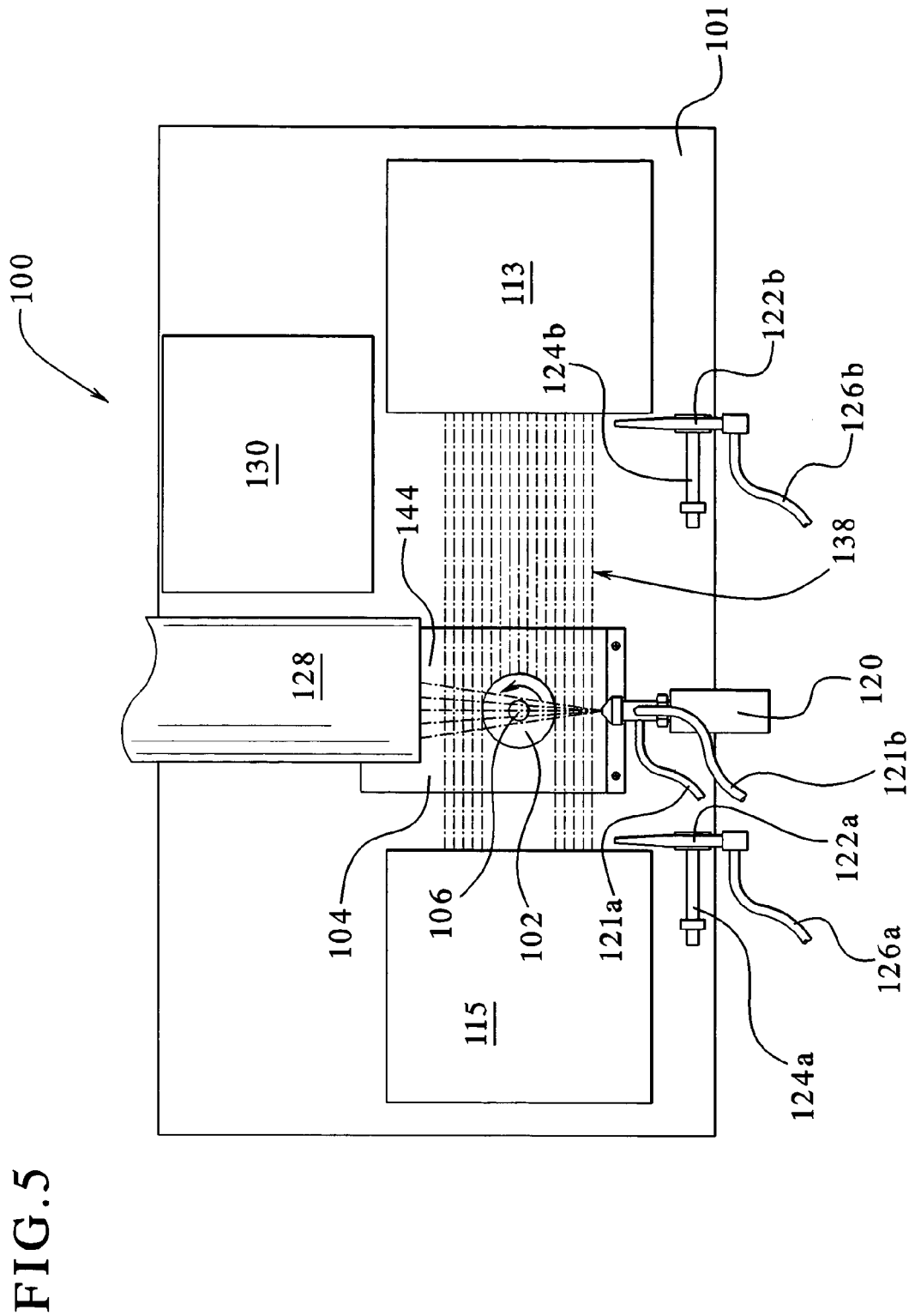
FIG. 5 is a top plan view of the embodiment of FIG. 4.
Figure 7:
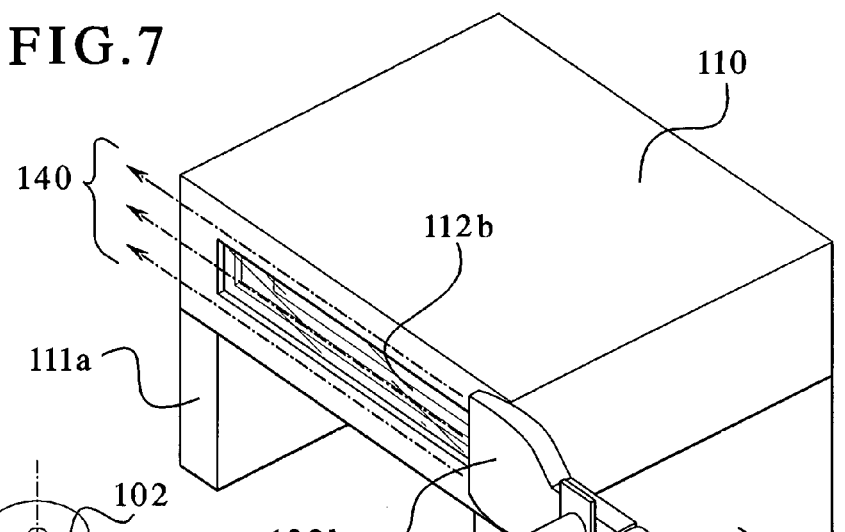
FIG. 7 is a perspective view of the laser generator and air mover of FIG. 1 where the air mover is directing air across the front surface of the laser generator.
Figure 6:
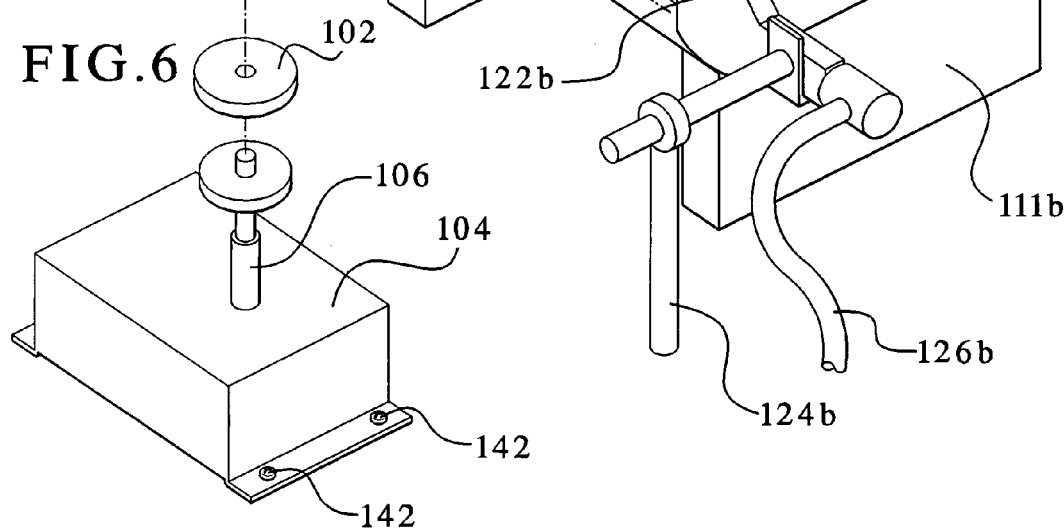
FIG. 6 is an exploded perspective view of the motor housing and part support having a part mounted on the part support.
Figure 8:
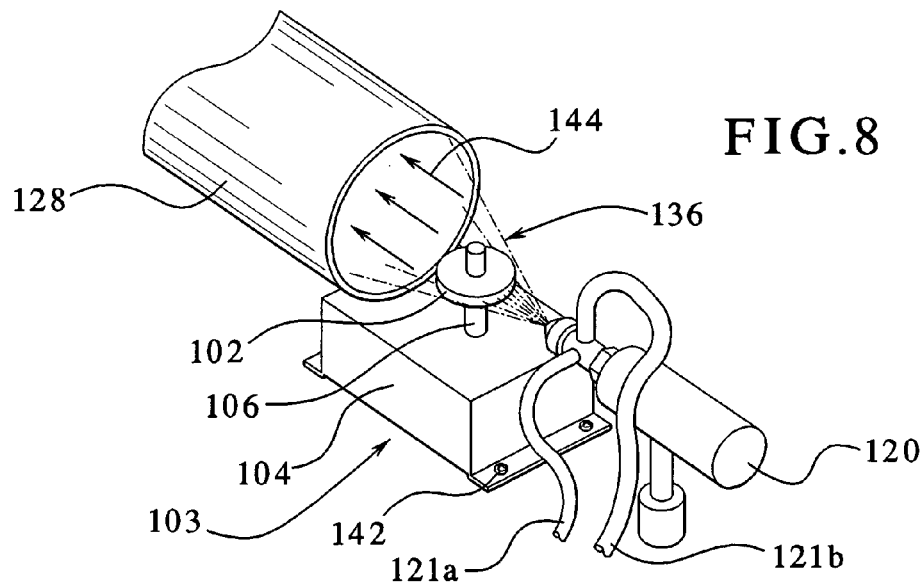
FIG. 8 is a perspective view of the sprayer, motor housing, part support, part and exhaust duct of FIG. 1 where the part is being coated by the sprayer.

In operation, the laser generator 110 such as the laser scan micrometer generates a laser beam that comprises several parallel extending rays which are horizontally projected at the level of the part 102. The laser beam is preferably wider than the part that is being measured as shown in FIGS. 4 and 5. As shown in FIG. 4, the laser beam 138 is projected onto part 102 to measure the outer surface or outer diameter of part 102 before, after and as the outer surface is being coated by sprayer 120. The portions of the laser beam 138 that are not blocked by part 102 proceed towards the beam receiver 106 as illustrated in FIGS. 4 and 5. The distance between the unblocked portions of the rays represent the outer dimension or diameter of the part 102. The beam receiver 164 detects and converts the received or unblocked portions of the laser beam to electrical signals. The electrical signals are then communicated or transferred to the processor (not shown) which performs a calculation of the measured dimension of the part based on the signal.

Referring now to FIGS. 1 and 2, in one presently preferred embodiment, an exhaust duct 128 is generally positioned on the opposing side of the part support 103 from the sprayer 120. The coating emitted by the sprayer is directed onto the part and any excess is directed towards the exhaust duct. The exhaust duct 128 is positioned adjacent to the part support 103 without obstructing the laser beam generated by the laser generator 110. An exhauster such as a pump (not shown) is connected to the exhaust duct 128 and creates a negative air pressure or suctioning effect at the inlet of the duct 128, which is adjacent to the part support 103. The exhaust duct 128 captures and removes excess coating such as coating overspray from the sprayer that does not adhere to the part during the coating process. The excess coating collected by the exhaust duct 128 is recycled or discarded. A filter (not shown) may be secured inside the exhaust duct 128 to capture the solid material of the coating.

Figure 11:
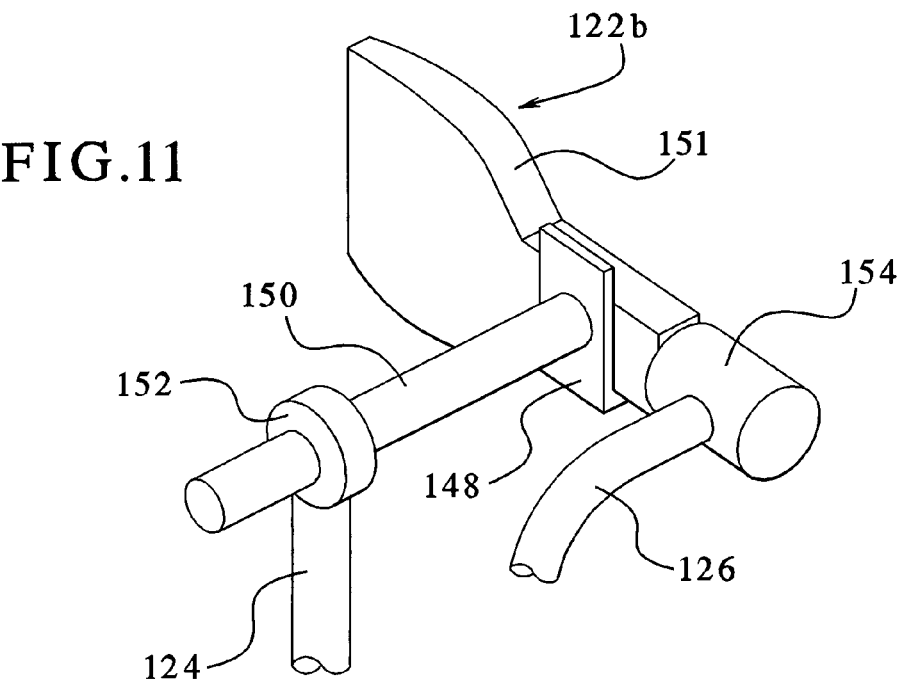
FIG. 11 is an enlarged perspective view of one of the air movers of the present invention.

Referring now to FIGS. 1, 2 and 11, in one preferred embodiment, air movers 122*a* and 122*b* are positioned adjacent to the laser generator 110 and laser receiver 108 to direct air across the working surfaces of each component and minimize the amount of excess spray or overspray that collects on the glass plates 112*a* and 112*b* of the housings for the laser generator and laser receiver. If a significant amount of coating adheres to the glass plates of the laser generator and laser receiver, such coating will obstruct the laser beam generated or received and thereby, creates inaccurate measurements of the part. Because the air movers 122*a* and 122*b* are identical, only air mover 122*b* will be described in detail herein. It should be appreciated that the components and functions of air mover 122a correspond to those of air mover 122b, which is described below.

Air mover 122b is positioned adjacent to a working surface of the laser generator 110 and is connected to the frame 101 by suitable fasteners. The air mover includes an air director or housing 151 and a valve 154. The air director housing 151 is secured to a bracket 148. A vertical support arm 124, which includes an integral support ring 152, is connected to the frame 101 on one end. The support ring 152 is adapted to receive a horizontal support arm 150. One end of the horizontal support arm 150 slides through the support ring 152 on vertical support arm 124. The slideable support arm 150 enables a user to adjust the position of the air mover 122b in relation to the laser generator. Once the position of the air mover is set, suitable fasteners are used to secure the support arm in place within the support ring 152. The other end of the support arm 150 is connected to the mounting bracket 148, which is connected to the housing 151. An air communication line 126 is connected to the valve 154 of the air mover 122b. The air communication line 126 is made of suitable tubing to withstand the air pressure within the tubing. The air is transported from an air generator such as the air compressor described above, to the valve 154. The valve 154 may be a solenoid or other actuator that opens and closes to regulate and control the amount of air that is directed from air mover 122b.

In one presently preferred embodiment, a monitor or display device 130 is positioned on the frame 101 so that a user can view the dimension measurements of a part before, after and during the coating operation. The monitor 130 is connected to the processor (not shown) using suitable wires or cables and displays the dimensional measurements of the part calculated by the processor. The monitor enables a user to instantaneously and continuously view the measurements of one or more dimensions of part 102 as the part is being coated and measured by the present apparatus. It should be appreciated that any suitable monitor such as a computer monitor may be used to display the dimension measurement data to a user. The monitor displays the dimension measurements to the user on screen 132.

Figure 14:
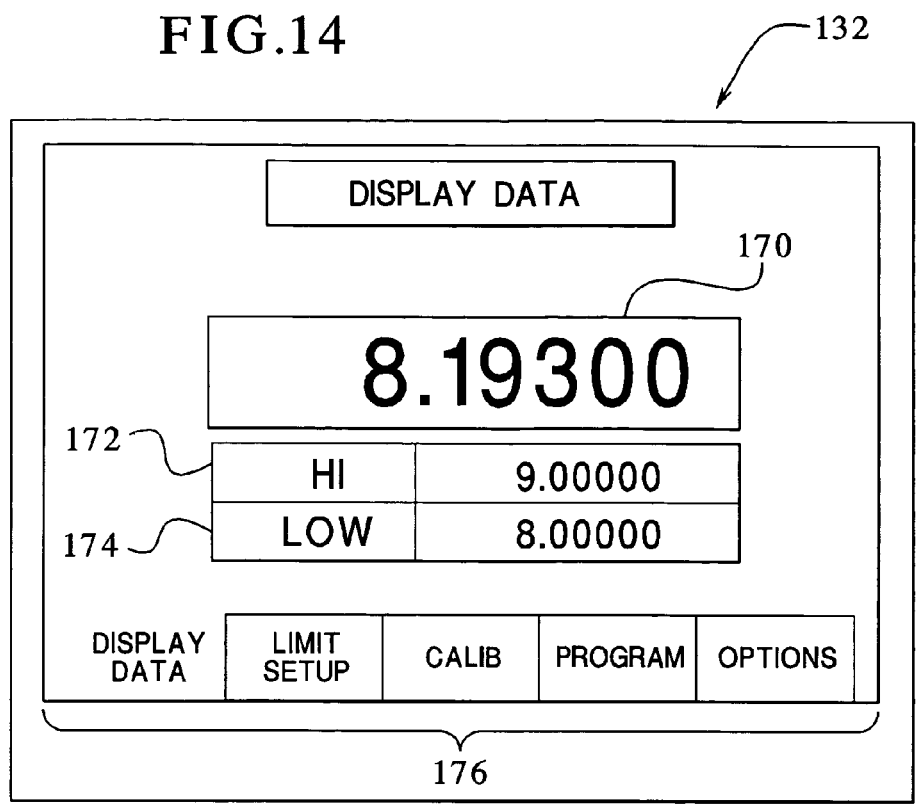
FIG. 14 is an enlarged elevation view of one embodiment of a display screen on a display device in the present invention.

Referring now to FIG. 14, one example of the information that can be entered and displayed on the monitor 130 is illustrated. In this example, the screen 132 on monitor 130 displays the dimensional measurement 170 of a particular dimension of the part 102. The screen can also display the dimensional tolerance levels for a particular dimension of the part such as the upper tolerance level 172 and the lower tolerance level 174. Additionally, other user selectable options can be displayed on the screen 130. As illustrated in FIG. 14, the user can change what type of information is displayed by using control selections 176. It should be appreciated that any suitable type of selection, dimension measurement or other criteria related to the coating and measurement of a part can be displayed on the screen 132 of monitor 130.

The apparatus of the present invention is used to coat a part 102 to achieve a final part or final product that meets predetermined dimensional design specifications established by the manufacturer. The final product, such as cylindrical part 102 shown in FIG. 13, has an upper dimension tolerance level 164, which is the largest acceptable dimension for the particular part after the part has been coated by the apparatus, and a lower dimension tolerance level 162, which is the minimum acceptable dimension for the particular finished part after the part has been coated by the apparatus. The dimension tolerance levels are generally the upper and lower acceptable dimension sizes of the part. The design specifications or tolerance levels may also be based on the thickness of one or more of the coatings applied to the part. In one embodiment, a target dimension or size 160 is established for each part. The target dimension 160 is the desired dimension of the finished parts, after coating, including any dimension adjustment due to heating and drying the coating on the part. In some parts, the difference between the upper and lower tolerance levels is very small (i.e., one thousandths of a centimeter) whereas in other parts there is a greater difference between the upper and lower tolerance levels. The dimension tolerance levels and the part sizes depend on the particular use of the part.

Figure 13:
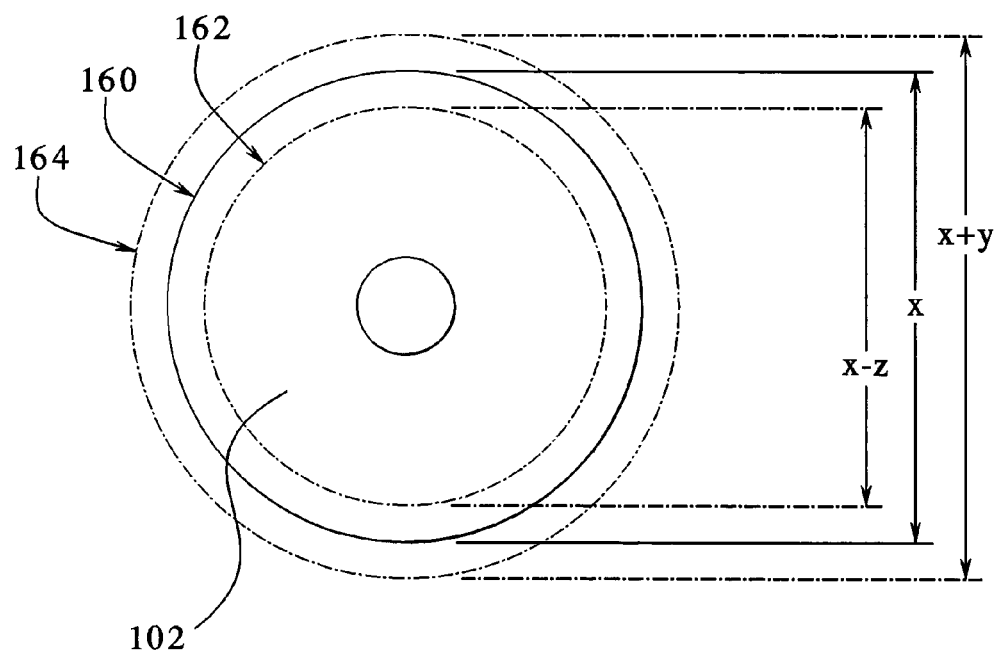
FIG. 13 is a schematic diagram showing the dimension tolerance limits of a particular part.

The goal therefore, is to coat the part so that the final coated part is within the acceptable dimension tolerance levels (i.e., between the upper and lower tolerance levels) and/or coating thickness specifications established for the part and in particular to achieve the optimal dimension size 160 and/or specified coating thicknesses for the part. As an example, the desired dimension of the part 102 may be a dimension "X" as shown in FIG. 13. An upper tolerance level 164 is determined as (X+Y), where Y is a predetermined amount of acceptable dimension variance from the optimal dimension X for the part. The acceptable amount of variance is determined by the manufacturer based on the use of the part. Similarly, a lower tolerance level 162 is determined which, in this case, is the dimension (X−Z) where Z is the acceptable amount of dimension variance for the part. The manufacturer or operator therefore coats the part 102 so that the dimension of the finished part is between the lower tolerance level (X−Z) and the upper tolerance level (X+Y). Again, optimally, the dimension of the finished part is approximately equal to the desired size 160 for the part, which is the dimension X.

Referring now to FIGS. 3A, 4, 5 and 9, one embodiment of the method of the present invention is illustrated where a part 102 is coated by the sprayer 120 based on a desired final dimension for the part. In this embodiment, the part is coated with an initial amount of coating and a final amount of coating. In the preferred embodiment, the initial amount of coating is greater than the final amount of coating. As described above, applying large amounts of coating to a part produces a greater margin of error. On the contrary, applying smaller amounts of coating to a part reduces the margin of error significantly. For example, applying a large amount of coating to a part, such as 95% to 100% of the total amount of coating, may include a margin of error such as plus or minus 2% to 3%. Applying a small amount of coating to the part may include the same margin or error, but because the amount is smaller the relative margin of error is smaller, such as plus or minus 0.02% to 0.03%. Given the above margin of error and that prior known coating processes usually apply all of the coating (i.e., 100% of the coating) to the part at one time, the final amount of coating actually applied to the part, including the margin of error, ends up being between 97% to 103% of the calculated amount of coating to be applied to the part. This range of error is especially problematic when the upper dimensional tolerance is exceeded. The result in several parts being discarded as waste because the parts do not fit within the tolerance levels.

In the present method, however, a smaller amount of coating is applied in a second or final step. By applying a smaller amount of coating in the second step based on the measurement of the coating applied in the first step, the present method reduces the relative margin of error in coating the part. Additionally, in the present method the total calculated amount of coating is based on the desired or target dimension for the coated part. In order to ensure that too much coating is not applied to the part, the sprayer shuts off when the amount of coating applied to the part is within a predetermined percentage of the total calculated amount of coating such as 0.01% to 2%. For example, if 95% of the total amount of coating is applied to the part in the initial step, then the actual amount of coating applied to the part will be between 92% and 98%, taking into account a margin of error of plus or minus 3%. Therefore, in the second step or final step, only 2% to 8% of the total amount of coating needs to be applied to the part to achieve the desired dimension for the part. Again, using a margin of error of plus or minus 3% for the final amount of coating and that the sprayer shuts off when approximately 99.98% to 99.99% of the total amount of coating is applied to the part, the total amount of coating applied to the part will be approximately between 99.94% (i.e., 3% of 2%) to 99.99% Thus, the present method reduces the relative margin of error with respect to the calculated amount of coating that is applied to the part and the final part size, and thereby significantly improves the accuracy associated with the coating method.

Referring now to FIG. 3A, the one method of the present invention includes the following steps. The part 102 is placed on the spindle 106 on the part support 103 as indicated by block 200. Next, a laser beam 138 is generated by the laser generator 110 and projected onto the part 102 to measure the part as indicated by block 202. Specific rays or portions of the laser beam are blocked by the part while the unblocked rays or portions of the laser beam are received by the laser receiver 108. The received laser beam, rays or portions are converted into electrical signals and communicated to the processor. The electrical signals indicate the distance between the unblocked portions of the laser beam or the size of the dimension of the part to be coated. The processor receives the signals and calculates an initial amount of coating to apply to the part based on the initial dimension or size of the part received from the laser receiver and the desired size of the part as indicated by block 204. The calculation preferably includes an adjustment factor, which accounts for the change in size of the coated part that occurs when the part dries or cures. In one embodiment, the initial amount of coating is greater than the final amount of coating for the reasons described above. In another embodiment, the initial amount of coating is a significant percentage of the total amount of coating such as approximately 95% of the total amount of coating. It should be appreciated that the initial amount of coating may be any suitable amount or suitable percentage of the total amount of coating which reduces the margin of error associated with the coating method. It should also be appreciated that multiple measurements of the part or dimension of the part may be made. For instance, the part may be rotated to take more than one dimension measurement.

Once the initial amount of coating is calculated by the processor, the operator presses an input such as a button on a control panel (not shown), which starts the coating process. Alternatively, in a fully automated apparatus, the processor communicates with the sprayers and other automated components of the apparatus to begin the coating process. The motor (not shown) in housing 104 is connected to the spindle 106 and rotates the spindle, which in turn rotates the part as indicated by block 204. As the part rotates, the sprayer 120 simultaneously receives the coating through coating communication line 121a and pressurized air through air communication line 121b. The coating and air enter the nozzle portion of the sprayer 120 and the air forces the coating out of the nozzle as an atomized spray. The sprayer 120 applies the coating to the outer surface of the part 102 while the part is simultaneously measured by the part measurer 117 as indicated by block 208. Air movers 122a and 122b direct air delivered via air communication lines 126a and 126b across the working surfaces of the housings holding the laser generator 110 and laser receiver 108. The air movers minimize the amount of overspray or excess coating from the sprayer that accumulates and coats the working surfaces of the housings holding the laser generator and laser receiver during the coating process. Thus, the air movers prevent or minimize the obstruction of the laser beam due to coating accumulation on the working surfaces of the housings holding the laser generator and the laser receiver.

As shown in FIGS. 4 and 5, as the coating is applied to the part 102 by sprayer 120, the outside diameter of the part increases and thereby blocks more of the laser beam 138 as the laser beam passes by the part 102. Thus, the portion of the beam received by the beam receiver 164 decreases in direct proportion to the amount of coating that is applied to the part and the distance between the unblocked portions of the laser beam increases. As a result, the processor continuously calculates a larger dimension measurement for the part being coated as the part is coated by the sprayer.

The processor communicates the dimension measurements to the display device 130, which displays the measurements on screen 132. As a result, the user or operator can continuously monitor the dimension of the section of the part as the section is coated by sprayer 120. This enables the user to know when the part is within the predetermined upper and lower tolerance levels for the part. In one embodiment, the processor delivers a prompt to the user or operator when the size of the part is within the upper and lower tolerance levels. The prompt may be an audio prompt, visual prompt or any other suitable prompt. Once the initial amount of coating is applied to the part 102, the processor signals the part support to stop moving the part 102 and also signals the sprayer 120 to stop coating the part as indicated by block 210 in FIG. 3.

The final amount of coating to finish coating the section of the part is calculated by the processor based on the difference between the final desired part size and the present size of the part including the initial amount of coating applied to the part as indicated by block 212. The sprayer 120 applies the final amount of coating to the part while simultaneously measuring the part as indicated by block 214. When approximately 99.98 to 99.99% of the final amount of coating is applied to the part, the processor signals the part support to stop moving the part and the sprayer to stop applying coating to the part as indicated by block 216. The coated part is removed from the part support as indicated by block 218 and the coating on the part is cured using a suitable curing method such as heating the coated part in an oven as indicated by block 220. When the coating on the part has cured, the part is placed in storage for use or shipping at a later time as indicated by block 222.

Figure 15:
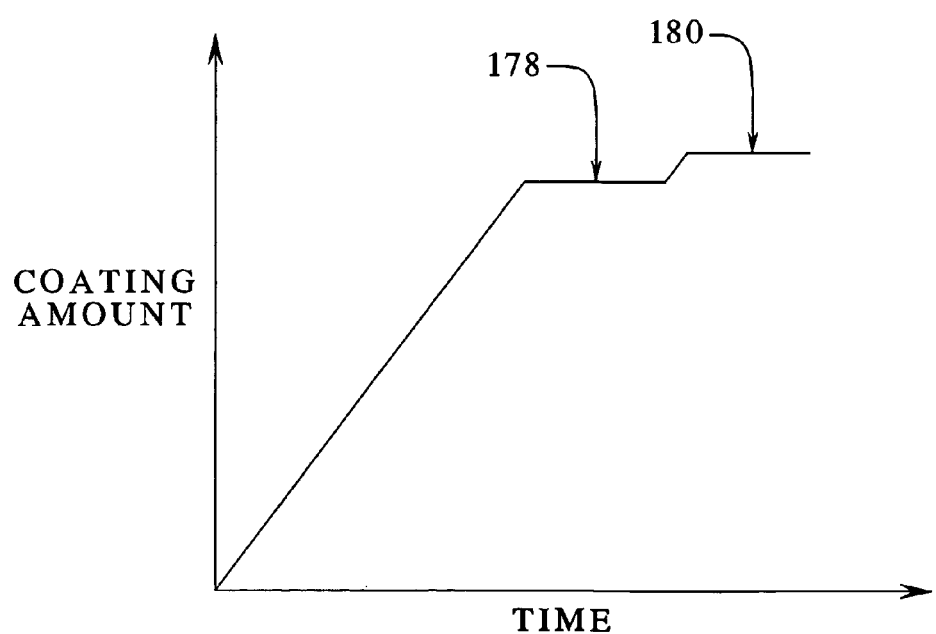
FIG. 15 is a graphical representation of the amount of coating applied to a part versus the coating application time.

Referring to FIG. 15, a graph illustrates the coating method of the embodiment described above. The graph plots the amount of coating applied to the part, which is indicated on the vertical axis, versus the time needed to apply the coating to the part, which is indicated on the horizontal axis. The initial amount of coating is applied to a dimension of the part as indicated by plateau 178 on the graph. Then, the final amount of coating is calculated by the processor and applied to the part to achieve the desired part size as indicated by plateau 180. The graph further illustrates the difference between the initial amount of coating and the final amount of coating applied to the part, which significantly improves the coating accuracy of the present method.

Referring now to FIGS. 3B, 4, 5 and 9, another embodiment of the method of the present invention is illustrated where a section or a portion of a part is coated. In this embodiment, the part 102 is placed on the part support 103 as indicated by block 300. The operator starts the apparatus by pressing a button, pedal or similar device as described above. The part is rotated on the part support as indicated by block 302. Then, the section of the part being coated is simultaneously sprayed by the sprayer and continuously measured by the part measurer 117 until an initial predetermined dimension, such as approximately 95% of desired dimension, is measured for that section. When the initial dimension is measured by the part measurer, the sprayer stops applying coating to the part as indicated by block 306. The processor then calculates a final amount of coating to apply to the section of the part as described above, to achieve the final part dimension or desired dimension of the section as indicated by block 307. The part is rotated again and the sprayer and part measurer simultaneously coat and measure the section of the part as indicated by block 308. When approximately 99.98 to 99.99% of the final amount of coating has been applied to the section of the part, the part support stops rotating the part as indicated by block 310. The part is removed from the part support as indicated by block 312 and sent to another manufacturing area for curing as indicated by block 314. The part is then stored for use or shipping as indicated by block 316.

Figure 3C:
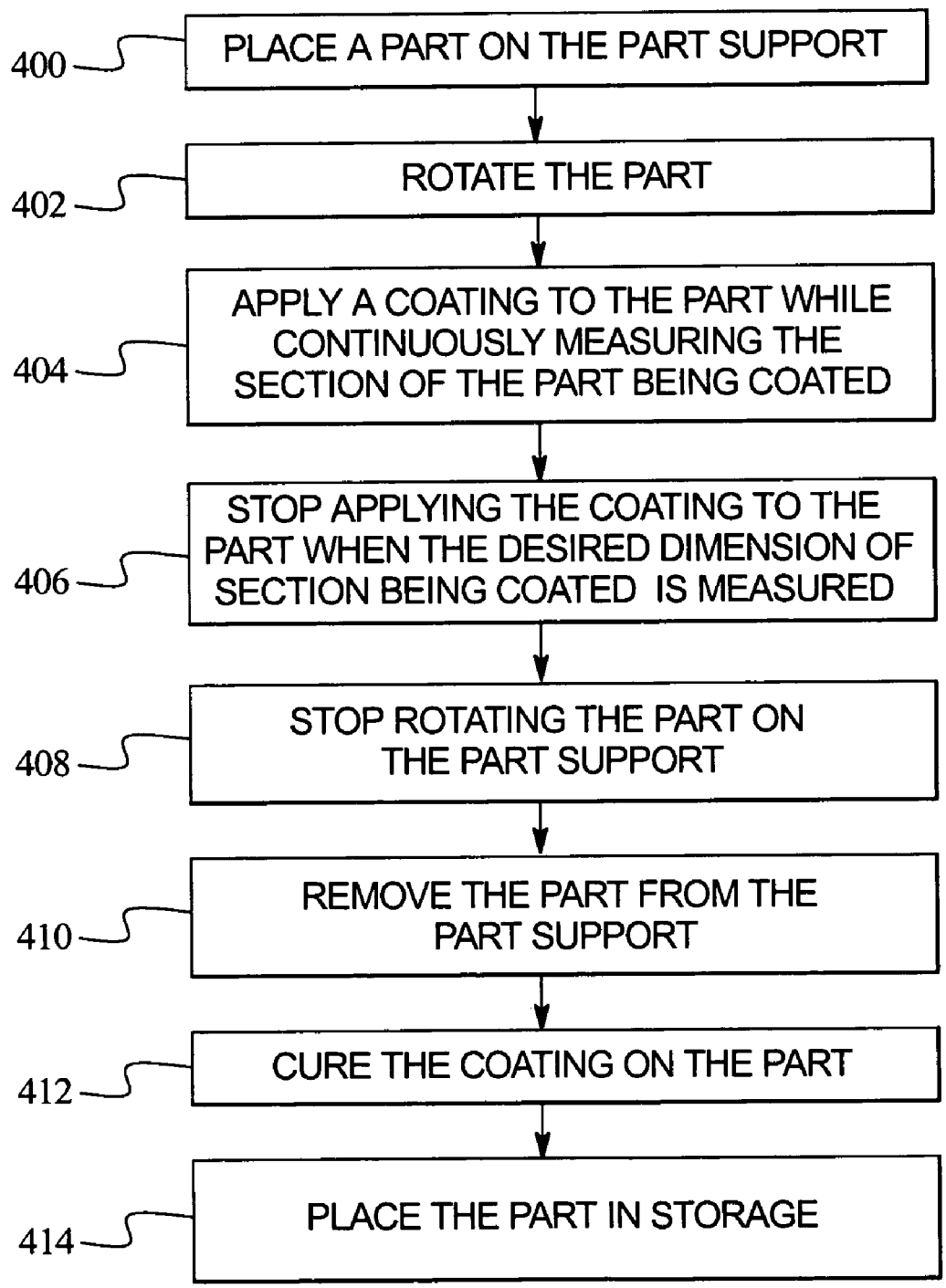
FIG. 3C is a flowchart illustrating another embodiment of the coating method of the present invention.

In a further embodiment illustrated in FIG. 3C, the sprayer applies a coating to the section of the part being coated while the part measurer continuously measures the section of the part being coated until the final dimension or desired dimension of the section has been measured by the part measurer. In this embodiment, the part is placed on the part support and rotated as indicated by blocks 400 and 402. The sprayer applies a coating to the section of the part while the dimension of the section is continuously measured by the part measurer as indicated by block 404. The sprayer continues to apply the coating to the section of the part until the desired dimension of the section is measured by the part measurer as indicated by block 406. The rotation of the part support is stopped and the part is removed from the part support as indicated by blocks 408 and 410. The coating on the part is then cured and the part is placed in storage for further processing as indicated by blocks 412 and 414.

In one embodiment, the parts are manually placed on and removed from the part support 103 such as the spindle 106 or the conveyor 107. This requires an operator to receive the part from the processing area and then manually place the part on part support 103. Similarly, the operator manually removes the part from the part support after the part has been coated and then sends the part for further processing. In another embodiment, a robotic device, such as a robotic arm (not shown), receives the part from the processing area via an operator or mechanical device such as a conveyor belt, and mechanically places the part on the part support 103. The mechanical handling of the part increases the efficiency and speed of the process and minimizes the amount of human contact with the part. Thus, the parts can be produced efficiently and quickly with minimal physical handling of the part during processing. The robotic device removes the part after it is coated and transports it to another manufacturing area for further processing.

In another embodiment of the invention, the parts are pre-measured or measured prior to coating the parts, to determine if the dimension or dimensions of the parts are within a range of acceptable dimensions or sizes. In one aspect, the parts are grouped in lots or batches and a representative sample of the parts is measured to determine if the entire lot or batch is within the acceptable size range. If a predetermined number of sample parts from the batch is not within the acceptable range, the entire batch is discarded or recycled. In another aspect, the section being coated on each part is measured to determine if the dimension of the section fits within the acceptable range of dimensions for the part. Any parts that fit within the acceptable range of dimensions are coated by the apparatus of the present invention.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A coating apparatus comprising:
   means for supporting a part;
   means positioned adjacent to the support means for applying an atomized coating to a section of the part; and
   means positioned adjacent to the support means for measuring the section of the part, wherein the measuring means measures a dimension of a section of the part being coated and the coating means applies an amount of coating to the section of the part based on said dimension measurements and desired final dimension of the section of the part, wherein the measuring means includes a laser generator and a laser receiver, said laser generator positioned adjacent to one side of the support means and said laser receiver positioned adjacent to an opposing side of the support means, wherein the laser generator and laser receiver are each mounted in housing means, wherein each housing means includes a transparent member connected to said housing, and which includes excess coating reducer means positioned adjacent to the transparent member of each housing.

2. The apparatus of claim 1, wherein the support means includes a part support.

3. The apparatus of claim 1, wherein the support means includes a conveyor.

4. The apparatus of claim 1, wherein the coating means includes at least one sprayer.

5. The apparatus of claim 1, which includes an exhaust duct positioned adjacent to the support means.

6. The apparatus of claim 1, which includes means for displaying the dimension measurements of the section of the part.

7. The apparatus of claim 1, which includes means for displaying at least one dimensional tolerance level of the section of the part.

8. The apparatus of claim 1, wherein the excess coating reducer means includes at least one air mover.

9. A coating apparatus comprising:
   a part support adapted to support a part;
   a laser generator and a laser receiver positioned on opposing sides of the part support, said the laser generator operable to project a laser beam at a level of a section of the part supported by the part support, said laser receiver operable to receive portions of the laser beam not blocked by the section of the part to take measurements of said section of the part;

a laser generator housing which includes a transparent member though which the laser beam passes through;
an excess coating reducer positioned adjacent to the transparent member of the housing; and
a sprayer positioned adjacent to the part support, said sprayer operable to apply an amount of coating to the section of the part based on said measurements and desired dimension of the section of the part.

10. The apparatus of claim 9, which includes an exhaust duct positioned adjacent to the part support.

11. The apparatus of claim 9, which includes a laser receiver housing which includes a transparent member though which said portions of the laser beam passes through, and a second excess coating reducer positioned adjacent to said transparent member of said housing.

12. The apparatus of claim 9, wherein the excess coating reducer includes an air mover.

13. A coating apparatus comprising:
a part support;
a sprayer positioned adjacent to the part support;
a part measurer including a laser generator and a laser receiver positioned on opposing sides of the part support and operable to measure a dimension of a section of a part supported by the part support and being coated by the sprayer based on said measurements and a desired dimension of the section of the part;
a laser generator housing including a transparent member which protects the laser generator mounted in said housing;
a first excess coating reducer positioned adjacent to the transparent member of said laser generator housing;
a laser receiver housing including a transparent member which protects the laser receiver mounted in said housing; and
a second excess coating reducer positioned adjacent to the transparent member of laser receiver housing.

14. The apparatus of claim 13, wherein the part support includes a conveyor.

15. The apparatus of claim 13, which includes an exhaust duct positioned adjacent to the part support.

16. The apparatus of claim 13, wherein the first excess coating reducer includes an air mover.

17. The apparatus of claim 16, wherein the second excess coating reducer includes an air mover.

18. A coating apparatus comprising:
means for supporting a part;
means positioned adjacent to the support means for applying an atomized coating to a section of the part;
means positioned adjacent to the support for measuring a section of the part, wherein the measuring means is operable to measure a parameter of the section of the part being coated and the coating means is operable to apply an amount of coating to the section of the part based on the parameter measurement and desired parameter measurement of the section of the part, wherein the measuring means is mounted in at least one housing which includes a transparent member; and
excess coating reducer means positioned adjacent to said transparent member to reduce excess coating near the transparent member which could interfere with the measuring means.

19. The apparatus of claim 18, wherein the support means includes a part support.

20. The apparatus of claim 18, wherein the support means includes a conveyor.

21. The apparatus of claim 18, wherein the coating means includes at least one sprayer.

22. The apparatus of claim 18, which includes an exhaust duct positioned adjacent to the support means.

23. The apparatus of claim 18, which includes means for displaying the parameter measurements.

24. The apparatus of claim 18, wherein the parameter is at least one of: a dimension of a section of the part; a thickness of a coating applied to the section of the part; and a thickness of a plurality of coatings applied to the section of the part.

25. The apparatus of claim 18, wherein the excess coating reducer means includes an air mover.

26. A coating apparatus comprising:
a rotatable part support;
at least one atomizing sprayer positioned adjacent to the part support;
a coating communication line and an air communication line connected to each sprayer;
a part measurer including a laser generator and a laser receiver positioned on opposing sides of the part support and operable to measure a dimension of a section of a part supported by the part support and being coated by the sprayer based on said measurements and a desired dimension of the section of the part;
a laser generator housing including a transparent member which protects the laser generator mounted in said housing;
a first excess coating reducer positioned adjacent to the transparent member of said laser generator housing;
a laser receiver housing including a transparent member which protects the laser receiver mounted in said housing;
a second excess coating reducer positioned adjacent to the transparent member of laser receiver housing;
an exhaust duct positioned adjacent to the part support;
a display device operable to display the dimension measurements of the section of the part.

27. The apparatus of claim 26, wherein each of the sprayers is operable to apply a different coating to the section of the part.

28. The apparatus of claim 26, wherein the coatings include a base coating, a middle coating and a top coating.

29. The apparatus of claim 26, wherein each of the sprayers includes a spray control which enables the sprayers to apply the coatings at different rates.

30. The apparatus of claim 26, wherein the first excess coating reducer includes an air mover.

31. The apparatus of claim 30, wherein the second excess coating reducer includes an air mover.

* * * * *